(12) United States Patent
Lipinski et al.

(10) Patent No.: US 10,478,972 B2
(45) Date of Patent: Nov. 19, 2019

(54) METHOD OF COVERING A SURFACE OF A BUILDING AND ROBOT THEREFOR

(71) Applicant: Q-BOT Limited, Wandsworth, Greater London (GB)

(72) Inventors: Tomasz B. Lipinski, Hanwell (GB); Peter Childs, Hove (GB); Mathew Holloway, East Dulwich (GB)

(73) Assignee: Q-Bot Limited, London (GB)

( * ) Notice: Subject to any disclaimer, the term of this patent is extended or adjusted under 35 U.S.C. 154(b) by 58 days.

(21) Appl. No.: 14/890,215

(22) PCT Filed: May 23, 2014

(86) PCT No.: PCT/GB2014/051604
§ 371 (c)(1),
(2) Date: Nov. 10, 2015

(87) PCT Pub. No.: WO2014/188221
PCT Pub. Date: Nov. 27, 2014

(65) Prior Publication Data
US 2016/0121486 A1 May 5, 2016

(30) Foreign Application Priority Data

May 23, 2013 (GB) .................................. 1309324.0
Jul. 3, 2013 (GB) .................................. 1311928.4

(51) Int. Cl.
*B25J 11/00* (2006.01)
*B05D 1/02* (2006.01)
(Continued)

(52) U.S. Cl.
CPC ............. *B25J 11/0075* (2013.01); *B05B 3/00* (2013.01); *B05B 13/005* (2013.01);
(Continued)

(58) Field of Classification Search
None
See application file for complete search history.

(56) References Cited

U.S. PATENT DOCUMENTS 2,176,891 A 10/1939 Crom
4,167,151 A * 9/1979 Muraoka ............. B01F 15/0237
118/323
(Continued)

FOREIGN PATENT DOCUMENTS

CA 2790710 4/2013
CN 1858376 11/2006
(Continued)

OTHER PUBLICATIONS

Spray Polyurethane Foam Insulation (Jul. 2012), available at https://www.youtube.com/watch?v=-6NKAC81yIQ.*
(Continued)

*Primary Examiner* — Michael P. Rodriguez
(74) *Attorney, Agent, or Firm* — McDonnell Boehnen Hulbert & Berghoff LLP

(57) ABSTRACT

A method of covering a surface of a building, the method comprising spraying an expandable foam material onto the surface and allowing the foam material to solidify whereby to form a covering of the surface and a robotic vehicle configured to carry out the method.

21 Claims, 34 Drawing Sheets

(51) Int. Cl.
*B05B 13/00* (2006.01)
*B05B 13/04* (2006.01)
*E04B 1/76* (2006.01)
*B25J 5/00* (2006.01)
*B05B 3/00* (2006.01)
*B25J 15/00* (2006.01)
*B25J 15/04* (2006.01)
*E04F 21/12* (2006.01)
*E04F 21/16* (2006.01)

(52) U.S. Cl.
CPC ...... *B05B 13/0405* (2013.01); *B05B 13/0431* (2013.01); *B05D 1/02* (2013.01); *B25J 5/007* (2013.01); *B25J 11/0055* (2013.01); *B25J 15/0019* (2013.01); *B25J 15/04* (2013.01); *E04B 1/76* (2013.01); *E04F 21/12* (2013.01); *E04F 21/16* (2013.01); *Y10S 901/01* (2013.01); *Y10S 901/43* (2013.01)

(56) References Cited

U.S. PATENT DOCUMENTS

| | | | |
|---|---|---|---|
| 4,210,098 A | 7/1980 | Harrison et al. | |
| 5,358,568 A | 10/1994 | Okano et al. | |
| 5,465,525 A * | 11/1995 | Mifune | A01M 7/00 180/167 |
| 6,000,484 A | 12/1999 | Zoretich et al. | |
| 6,126,766 A | 10/2000 | Hunter | |
| 6,210,753 B1 * | 4/2001 | Vohs | B05D 3/12 427/244 |
| 2002/0112442 A1 | 8/2002 | Sperber | |
| 2003/0108718 A1 * | 6/2003 | Simon | B29C 44/06 428/172 |
| 2003/0155001 A1 | 8/2003 | Hoetzer et al. | |
| 2004/0140379 A1 | 7/2004 | Dexter | |
| 2005/0288394 A1 * | 12/2005 | Rothman | C09D 7/1291 523/219 |
| 2006/0283981 A1 | 12/2006 | Mead et al. | |
| 2007/0009706 A1 * | 1/2007 | Beck | C08J 7/047 428/99 |
| 2008/0159616 A1 * | 7/2008 | Fellinger | G01N 25/72 382/141 |
| 2008/0190682 A1 | 8/2008 | Mahy et al. | |
| 2010/0024887 A1 | 2/2010 | Williams et al. | |
| 2011/0138724 A1 | 6/2011 | Olang | |
| 2013/0062133 A1 | 3/2013 | Budweil | |
| 2013/0081346 A1 | 4/2013 | Kulprathipanja et al. | |
| 2013/0295338 A1 * | 11/2013 | Keating | B33Y 30/00 428/174 |

FOREIGN PATENT DOCUMENTS

| | | |
|---|---|---|
| CN | 101435221 | 5/2009 |
| CN | 101435254 | 5/2009 |
| DE | 10211331 | 10/2003 |
| EP | 2213805 | 8/2010 |
| GB | 1300352 | 12/1972 |
| GB | 2046339 | 11/1980 |
| GB | 2062049 | 5/1981 |
| JP | S5551630 A | 4/1980 |
| JP | 05163769 | 6/1993 |
| JP | H05302429 A | 11/1993 |
| JP | H0691586 A | 4/1994 |
| JP | H06226156 A | 8/1994 |
| JP | 2008024541 | 3/2008 |
| JP | 2008302446 A | 12/2008 |
| WO | WO9303854 | 3/1993 |
| WO | WO0173235 | 10/2001 |
| WO | 2004001158 | 12/2003 |
| WO | WO2003104052 | 12/2003 |
| WO | 2004/024541 | 3/2004 |
| WO | WO2005102544 | 11/2005 |
| WO | WO2006071519 | 7/2006 |
| WO | WO2009037550 | 3/2009 |
| WO | WO2011021080 | 2/2011 |

OTHER PUBLICATIONS

Pro Foam Insulators—www.profoaminsulators.com—Spray Foam (Dec. 2010), available at https://www.youtube.com/watch?v=g81QgO6zeOs.*

Closed Cell Spray Foam Insulation Application (Nov. 2009), available at https://www.youtube.com/watch?v=gLJr1QkY_ec.*

* cited by examiner 301  302

METHOD OF COVERING A SURFACE OF A BUILDING AND ROBOT THEREFOR

This invention relates to a method of covering a surface of a building and to robots therefor. In certain embodiments, the method provides an additive, subtractive, additive manufacturing process using expanding building materials to quickly construct buildings, or improve existing ones. The process may be delivered manually by human operators, or through a computer controlled system, and comprises spraying expanding building materials such as polyurethane foam onto the interior or exterior surfaces of a building, shaping the material to remove excess and applying a finishing treatment. This invention also relates to a robot for spraying insulation, and a method of using such a robot. Indeed the invention extends to robots configured to operate in confined spaces.

BACKGROUND

It is known to improve the thermal performance of buildings by insulating the walls (or, more generically, the external fabric or building envelope, such as walls, floor and roof) of those buildings. This can be currently achieved by fixing insulation boards or bats to walls or fitting these between joists and rafters. Spray insulation foam, such as Polyurethane is known, and can be sprayed onto the walls or roof structure in order to reduce the amount of heat that is transferred through the building fabric. In most cases, however, doing so is a labour intensive process, particularly when it is desired to insulate the cavity underneath the suspended wooden ground floor of many older (pre 1919) British (and European) solid brick houses. It can also be potentially hazardous due to the nature of the chemical processes involved in spraying the insulation and sharp building fixings and surfaces. In such cases, the ground floor is formed of floorboards supported by joists, and the cavity below the floorboards is designed to remove ground moisture, gases and prolong the life of the timber floor, but remains a ventilated but otherwise unused void, typically occupied by building debris, wiring and the like. However, heat can escape from the ground floor rooms, through the void and then through the external walls and ventilation openings.

It is therefore desirable to insulate the floor whilst retaining such voids, but doing so is a labour intensive and awkward task, not merely due to the technical requirements to spray insulation within such a cavity, but also to lift the floorings and the possessions of the occupants of the buildings which would otherwise have been resting on the floor. This is inefficient, given that this will usually mean moving the occupants of such a house out of their dwelling (and removing furniture, destroying carpets, floor boards, generating waste and associated strife) whilst the insulation is applied.

Recognising the various challenges posed by the need to insulate millions of inefficient buildings there are a number of potential solutions.

Cutting insulation boards to fit interior walls, floor voids and ceilings, is labour intensive, never 100% effective and will usually mean moving the occupants of such a house out of their dwelling (and removing furniture, destroying carpets, floor boards, generating waste and associated strife) whilst the insulation is applied. Cutting insulation panels to fit exterior surfaces is again labour intensive, has a number of technical challenges, and has massive planning and aesthetic implications.

Application of foam to the outside walls, for example by spraying insulation can only be applied in particular situations, does not offer a finished product, requires scaffolding and multiple workers to install.

Current 3D mapping of building surfaces and insulation installation processes (EP2213805) deal either with internal wall insulation and require multiple workers for insulation, occupant disruption and create cold bridges, or require scaffolding, additional work for applying the finish, and a significant number of workers.

It is known to use spraying techniques within the construction process to both build 3D structures and components of them (for example wall panel composites as described in JPH05163769 MIYOSHI YASUO), fill in cavities with insulation (such as WO2006071519 FAY RALPH MICHAEL), and apply finishing treatments to surfaces by spraying (for example JINGTING ZHANG CN101435221 or FAY RALPH MICHAEL CA2790710). These construction processes are often referred to as '3D printing of buildings' and use computer controlled processes to control how materials such as concrete are layered to create the desired structure.

More specifically there are various methods for applying insulation to internal or external walls, floors and roofs by hand or machine, e.g. KEMPE STEVEN ALLAN et al WO0173235, or KLEIN HANS et al DE10211331.

A number of methods describe how insulation or other building materials can be applied to existing surfaces or into cavities of existing structures with the excess material shaped by hand or covered. These include; US 2002/0112442 A1 (Sperber) where a two part insulation material is applied to a webbing and then shaped by hand to finish; GB 2046339 A (Aerocon) which uses layers of aerated concrete which can have a layer of insulation added; and US 2011/0138724 (Olang) where insulation foam combined with loose fill insulation is applied to a cavity wall, excess foam is removed and then covered. While WO 2009/037550 A2 (Dini Enrico) and WO 2011/021080 A2 (Monolite) describe methods for constructing buildings using the application and finishing of traditional building materials through a computer controlled gantry to 3D print buildings.

However all of these methods have a similar set of problems the application and finishing of the insulation requires significant human input and is largely done by hand or by human operated machines, or they require a structure around the whole building. While it is known to apply insulation to the surfaces of a building these techniques result in an uneven surface finish that requires significant finishing, and there is no way to guarantee consistent results and measure performance. Most on site fabrication techniques are limited by the speed and volume in which the building materials can be made. Transporting large volumes of materials or prefabricated components to construction sites has significant cost and logistical problems, as well as practical limitations within the site, e.g. moving materials from road access to where they are required through restricted openings.

However a system that allows 3D printing of an expanding insulation material to existing surfaces and structures, or the fabrication of new ones, which includes the means to apply the insulation to suit the given 3D surface, monitor the application depth, remove excess material and apply finishing treatments would significantly reduce disruption, reduce the amount of labour required and therefore the cost to construct, improve and insulate buildings, whilst also providing more consistent and complete results without the technical and logistical issues of current methods.

The present invention, at least in its presently preferred embodiments, seeks to address at least some of the above issues.

BRIEF SUMMARY OF THE DISCLOSURE

Viewed from one aspect the present invention provides a method of covering a surface of a building, the method comprising spraying an expandable foam material onto the surface and allowing the foam material to solidify whereby to form a covering of the surface.

Thus, in accordance with the invention a simple method of covering a surface of a building is provided which has wide applicability.

The foam material may be a polyurethane foam or other open or closed cell foam.

The method may further comprise shaping the foam material after application to the surface whereby to provide a desired shape of the covering. The desired shape may be a desired 3D shape, for example having the appearance of brickwork.

The foam material may be shaped by applying a mould to the surface and spraying the foam material into the mould. The mould may be removed after the foam material has solidified. The mould may be positioned repeatedly on the surface in different positions until the surface is covered.

Alternatively, or in addition, the foam material may be shaped by machining the solidified foam material to remove excess foam material and form a desired shape of the covering. The foam material may be shaped by a cutting tool or an abrasive tool, for example.

A surface coating may be applied to the solidified foam material. The surface coating may comprise polyurea.

In embodiments of the invention, the surface is an external surface of the building. For example, the surface is an external wall of the building.

In embodiments of the invention, the surface is an internal surface of the building. In a particular embodiment, the surface is the underside of the floor of a building.

The foam material may be sprayed by a robotic device carrying a spray nozzle and coupled to a source of the foam material. The robotic device may comprise a cutting tool for machining the solidified foam material to remove excess foam material and form a desired shape of the covering. The cutting tool may replaces the spray nozzle during machining of the solidified foam material. For example, the robotic device may comprise a plurality of interchangeable tool heads, one of which may be the spray nozzle.

The robotic device may comprise a sensing device configured to monitor the thickness of the covering applied to the surface. The sensing device may simply be a camera arranged to identify that the covering has been applied to the surface. The sensing device may be a rangefinder, for example a laser rangefinder. The robotic device may configured to apply the foam material autonomously to the surface in order to achieve a required distribution, for example a required thickness, of the covering.

The robotic device may comprise a robotic arm configured to move the spray nozzle over the surface. Indeed the invention extends to a robotic device configured for carrying out the methods described herein.

The robotic device may be a robotic vehicle comprising a propulsion system configured to move the robotic vehicle relative to the surface. The propulsion system may comprise at least one driven wheel.

The robotic vehicle may comprise a chassis having a length and the at least one wheel may be mounted so as to have two positions relative to the chassis: a first position where the wheel is positioned so as to be able to drive the robot in the direction of the length of the chassis and a second position where the rotational axis of the wheel is aligned with the length, in which the maximum cross-sectional area of the robot in a plane perpendicular to the length is less in the second position than in the first position.

Thus viewed from one aspect, the invention provides a robotic vehicle comprising a chassis having a length, a propulsion system configured to move the robotic vehicle relative to a surface, the propulsion system comprising at least one driven wheel, wherein the wheel is mounted so as to have two positions relative to the chassis: a first position where the wheel is positioned so as to be able to drive the robot in the direction of the length of the chassis and a second position where the rotational axis of the wheel is aligned with the length, in which the maximum cross-sectional area of the robot in a plane perpendicular to the length is less in the second position than in the first position.

The robotic vehicle may comprise a pair of wheels mounted on a wheel mounting member, with the wheel mounting member spacing the wheels apart and the wheel mounting member being pivotally mounted on the chassis, rotation of the wheel mounting member relative to the chassis causing the wheels to move between the first and second positions. In the second position, the wheel(s) may be configured to drive the robot in a direction transverse to the length of the chassis.

Each wheel of the pair may be pivotally mounted to the wheel mounting member, whereby each wheel has a third position in which the wheel mounting member is aligned with the length of the chassis and the wheel is positioned so as to be able to drive the robot in the direction of the length of the chassis.

In one embodiment, the robotic vehicle may comprise a pair of wheels mounted on a wheel mounting member, with the wheel mounting member spacing the wheels apart, wherein the wheel mounting member is configured to vary the relative spacing of the wheels of the pair. The wheel mounting member may be telescopic. The wheel mounting member may comprise a scissor mechanism.

The robotic device may comprise an optical sensor and at least one air nozzle, the air nozzle being arranged to direct an air stream across a surface of the optical sensor, whereby to prevent deposition of debris on the optical sensor.

Thus, viewed from one aspect the invention provides an optical sensor for a robotic device, the optical sensor having at least one air nozzle arranged to direct an air stream across the surface of the optical sensor, whereby to prevent deposition of debris on the optical sensor. The air stream may form an air curtain in front of the optical sensor.

The invention provides for an additive, subtractive, additive manufacturing system for applying building material(s) to new and existing buildings that comprises a three stage process: a method for applying the building material on 3D surfaces; a method to remove excess material and shape the surfaces; and a method for applying a finishing treatment to the surface.

According to the first stage a method to spray or extrude a two part expanding foam through a nozzle, that when mixed expands rapidly and binds with the surface on which it is sprayed to facilitate 3D printing onto walls, floors or roofs. The surface may be, for examples an existing part of the building, e.g. wall, floor or roof, or a lightweight prefabricated substrate.

The foam may consist of a closed or open cell thermally insulating material (such as polyurethane) combined with a binder for adhesion, that typically expands 25 fold on impact (with full expansion achieved within 18 seconds from leaving the spraying head and structural rigidity achieved within 60 seconds).

Since the printing is based on chemical reaction as opposed to molten material the finished product has high dimensional stability and can withstand temperatures above 200° C.

According to the secondary stage a method is used to remove excess material and create the desired 3D shape. This method may use one or more tools such as rotary drills, cutters, sanding, rubbing, compression, the application of a mould, water jet cutting, heat or other means to create the desired shape and surface.

According to the third stage a method is provided to clean and apply a final surface treatment. This may consist of: water jet; weather proofing; surface coatings, binders, surface textures; or paint.

The final coating (such as polyurea) provides texture, colour and protection from the elements. Patterns such as stone walls, pebble dash or brick work may be applied to give the construction a more natural appearance.

In one preferred embodiment of the invention a system is provided that comprises: a platform that facilitates access to different parts of the building; one or more head(s) that facilitates different operations which optionally may be mounted on a robotic arm; a control system.

An aspect of the invention includes the use of a platform that may be selected from the following list: an access platform such as a scissor lift that may be wheeled or tracked; a crane; rails such as scaffolding that need to be installed prior to operation; a platform suspended below the building; or attached to an industrial machine such as digger replacing the current arm or tool.

The platform may be varied to suit the size and nature of the building being treated, from single story dwelling, multi-story house, to tower blocks and skyscrapers.

The platform may be moveable, by wheels or other means, or be installed around the building to be treated, e.g. a crane or scaffolding.

In a further desirable aspect the platform may be selected from any pre-existing third party access platform and an adaptable chassis with mounting points provided that can attach to said platform provided.

According to an aspect of the invention either a single multipurpose head or multiple heads are attached to the platform to facilitate each part of the three stage process.

The head may be mounted on the platform through chassis and a movable arm, which allows the angle of the head relative to the chassis to be varied. As such, the head may therefore be able to aim at a variety of directions relative to the chassis. The moveable arm may be pivotable about at least two non-parallel, and preferably perpendicular axes. It may be pivotable about an axis perpendicular to the length of the chassis and/or an axis along the length of the chassis.

The head may be interchangeable to suit different operations, e.g. spraying, cutting or finishing. Alternatively or additionally, each operation may be conducted by separate machines each tailored to its specific job.

The source of thermal insulation or other materials such as water may be a port to which a supply pipe carrying the insulation can be fitted. Alternatively or additionally, the source may comprise a container carried on the chassis.

The head and robot arm may comprise a receiver for receiving command signals to control at least one of its motion and its spraying activity. This may be a wireless receiver for receiving signals wirelessly, such as a radio receiver, or may comprise a wired receiver, arranged to receive signals over a wired connection. The wired connection may form part of an umbilical cord connecting the robot to the services.

According to an aspect of the invention a control system is provided that combines some or all of the following elements: 3D surveying and mapping of existing buildings, for example by using range finding sensors, 2D and/or 3D imaging systems; the ability to read a pre-determined profile or CAD model of the building, e.g. the architects drawings; the means to create and follow a set of instructions, that includes where to apply insulation, how much insulation will be deposited and surface finishes; the means to calibrate the robot's position against the instructions by using visual markers or 3D space markers; real time position sensing, orientation and automatic head adjustment; feedback to the moveable platform so an operator can control its position manually or the platform can be positioned automatically; monitoring and control of the thickness and coverage of the deposited material using visual and depth feedback; the means to gather data on the resulting finish, e.g. depth of finish, percentage area of the surface covered; and/or the ability to calculate energy and $CO_2$ savings based on the improvements made.

The method may comprise mapping the cavity before spraying the insulation. The step of mapping may comprise determining the positions of the surfaces to be sprayed, and may comprise determining the perimeter of the surfaces, total height, obstructions, windows, cabling, and other issues, typically in order to prepare for access. Whilst this may be done with the robot, the step of mapping the cavity may be carried out before the robot is introduced to the site. As such, the step of mapping may comprise the step of introducing a mapping apparatus or surveying equipment. The surveying equipment may be provided with a sensor for sensing the position of the walls to be sprayed, such as ultrasonic range finders, infra-red imaging, one or more cameras.

The invention described above allows solid wall insulation (SWI), roof insulation or floor insulation, to be directly 3D printed on existing building façades by an automated robotic device and has the following advantages over the prior art: dramatically faster than conventional 3D printing technologies while allowing for high resolution precise cutting/jetting to be used where required; the 25 fold expansion of sprayed material on impact also significantly reduces the requirement for material on site, further increasing the speed and quality of construction; using this system, installation can be undertaken by only one skilled operative in a day at 50% of the costs required for the installation of traditional materials; the new process is user-centred, allowing for the customisation of the external appearance of the house to a much greater extent than a traditional retrofit process; and facilitates the printing of high speed/high volume large scale objects such as building facades, building components (on site) or even whole buildings that are normally constrained by the necessity of bringing prohibitively large volumes of material to site as well as slow and expensive print process.

This new process will dramatically reduce the requirement for material and workers on site, eliminate the need for scaffolding, eliminate wet trades, minimise/eliminate building access issues and improve the speed and quality of construction. The features of the proposed invention enables a solution that combines efficiency, automation and precision.

According to an aspect of the invention, we provide a robot for spraying insulation, comprising: a chassis carrying a spray nozzle; a source of spray thermal insulation coupled to the nozzle; and a propulsion system mounted on the chassis arranged to drive the robot over a surface on which it is located. Thus, we present a robot that can be used to apply thermal insulation to locations such as under-floor cavities, thus providing a new way in which such insulation can be provided. In particular, the robot may advantageously be used to spray insulation in awkward cavities where manual spraying would have been difficult or inconvenient, or where access is difficult.

The robot may be sized so as to fit in an underfloor cavity. As such, the robot may be fit within a 25 cm by 15 cm by 50 cm cuboid. This allows access into more confined spaces that would have conveniently been possible with manual spraying. The source of spray thermal insulation may be a port to which a supply pipe carrying the insulation can be fitted. Alternatively or additionally, the source may comprise a container carried on the chassis.

The propulsion system may comprise at least one wheel. Each wheel may be mounted so as to have two positions relative to the chassis, the chassis having a length: a first position where each wheel is positioned so as to be able to drive the robot along the length of the chassis and a second position where each wheel are aligned with the length, in which the maximum cross-sectional area of the robot in a plane perpendicular to the length is less in the second position than in the first position.

Alternatively or additionally to comprising at least one wheel, the propulsion system may comprise at least one flexible driven track, or a plurality of legs arranged to drive the robot over the surface.

Thus, this allows for an insulation-spraying robot which having a configuration in which the overall cross sectional area is reduced. This allows the robot to be introduced into spaces through a confined opening. In the case where the opening is specially made in order to introduce the robot into the space to be sprayed, this reduces the size of the opening required.

As such, a new method of working can be provided for applying underfloor insulation. An opening can be made in the wall surrounding the underfloor cavity (typically an exterior wall) and the robot can be introduced, typically with the wheels in the second position. The wheels can then be moved into the first position so as to move the robot around the underfloor cavity, spraying insulation as appropriate.

Where we refer to "aligned" with respect to each wheel, we will typically mean that the wheel has an axis of rotation, which will be parallel with the length in the second position. Furthermore, where there are a plurality of wheels, such as the typical situation where there are a pair of wheels, the axes of rotation of each wheel may be coaxial in the second position as well as being parallel to the length of the chassis.

In the first position, the axis of rotation of each wheel may be generally perpendicular to the length of the chassis, so that rotation of each wheel drives the chassis along its length. However, each wheel may also be steerable over a predetermined range (which may be less than 180 degree, and typically less than 135 or 90 degrees) in order to steer the robot. There may be a pair of wheels. The pair of wheels may be mounted on a wheel mounting member, with the wheel mounting member spacing the wheels apart. The wheel mounting member may be pivotally mounted on the chassis, rotation of the wheel mounting member relative to the chassis causing the wheels to move between the first and second positions. The wheel spacing member may be positioned perpendicular to the length in the first position and parallel, and typically along, the length in the second position.

The maximum cross section of the chassis in the second position may be that of each wheel, potentially plus a margin of less than 50 mm, and preferably less than 20 mm.

Thus, in the second position, the chassis and/or the remainder of the robot excluding each wheel and the chassis may fit within the cross section of each wheel, possibly plus the margin. The nozzle may be mounted on the chassis through a movable arm, which allows the angle of the nozzle relative to the chassis to be varied. As such, the nozzle may therefore be able to aim at a variety of directions relative to the chassis. The moveable arm may be pivotable about at least two non-parallel, and preferably perpendicular, axes. It may be pivotable about an axis perpendicular to the length of the chassis and/or an axis along the length of the chassis.

The robot may be provided with further undriven wheels arranged to support the chassis above a surface. However, as an alternative, the robot may be provided with a bearing surface on its underside, typically on the chassis, which is dragged along the surface as the wheels drive the chassis. The bearing surface may be curved, such as part-spherically, in order to negotiate uneven surfaces. This allows a lower-profile robot to be provided, as it is not necessary to provide a second set of wheels which could potentially increase the cross-section of the robot.

The robot may be provided with a tail, which extends away from the robot at an end of the chassis distal from the wheels along the length. The tail may be connected to the chassis through a clutch, which permits rotation of the tail about the chassis about a first axis (typically horizontal) perpendicular to the length and parallel to the axis of rotation of each wheel in the first position but restricts rotation of the tail about the chassis about a second axis (typically vertical) perpendicular to the length and the first axis.

The tail may also provide a connection for the supply pipe, and typically will comprise the supply pipe itself. Such supply pipes tend to be heavy, semi-rigid and an obstacle to movement or agility. However, by providing the clutch, we can make use of the otherwise disadvantageous features of the supply pipe. The tail can be used for balance, support and grounding, so that a second set of wheels are not needed. The clutch allows the robot to reverse easily while looping the hose sideways. The robot may comprise a receiver for receiving command signals to control at least one of its motion and its spraying activity. This may be a wireless receiver for receiving signals wirelessly, such as a radio receiver, or may comprise a wired receiver, arranged to receive signals over a wired connection. The wired connection may form part of the tail.

Each wheel may comprise a tyre surrounding a motor arranged to drive the tyre. This reduces the need for external gearboxes or so on and as such provides for a lower profile. The outer surface of each tyre may be provided with protrusions such as spikes or bumps for improved traction.

According to an aspect of the invention, there is provided a method of spraying thermal insulation into a cavity, the method comprising introducing the robot of the first aspect of the invention into the cavity and causing it to spray the insulation through the nozzle onto at least one internal wall of the cavity.

Thus, we present a method of using the robot of the first aspect of the invention to insulate a cavity, in particular a cavity such as an underfloor cavity, with an internal wall including the underside of a suspended timber floor in an under-floor cavity.

The cavity will typically be an underfloor cavity, typically an underfloor cavity below floorboards of a suspended ground floor of a brick-built domestic dwelling. Such dwellings present a particular problem to insulate, especially those built a significant time ago (pre 1919) before the importance of insulation was appreciated.

The robot may be introduced into the cavity through a hole in one of the walls of the cavity. The hole may be larger than the maximum cross sectional area of the robot in the second position but smaller than the maximum cross sectional area of the robot in the first position, the cross sectional areas being taken along a plane perpendicular to the length. The method may comprise the step of making the hole in the wall prior to introducing the robot. The method may comprise mapping the cavity before spraying the insulation. The step of mapping may comprise determining the positions of the internal walls to be sprayed, and may comprise determining the perimeter of the cavity, total height, obstructions, cabling, leaks and other issues, typically in order to prepare for access. Whilst this may be done with the robot, the step of mapping the cavity may be carried out before the robot is introduced into the cavity. As such, the step of mapping may comprise the step of introducing a mapping apparatus, such as a mapping robot into the cavity. The mapping robot may be provided with at least one sensor for sensing the position of the walls to be sprayed and potentially other obstacles.

The method may further comprise the step of determining a path for the robot to traverse the cavity so as to spray the walls. This path may be transmitted to the robot (typically using the receiver) so that, when the robot is introduced into the cavity, it follows the path. The path may also include instructions for the positioning of the nozzle relative to the chassis for each position along the path.

For all of the aspects of the invention, examples of suitable thermal insulation include foam insulation, such as polyurethane foams.

BRIEF DESCRIPTION OF THE DRAWINGS

Embodiments of the invention are further described hereinafter with reference to the accompanying drawings, in which.

DETAILED DESCRIPTION

Figure 1:
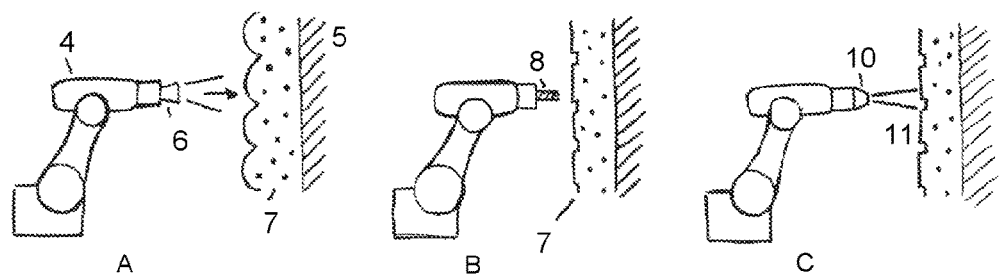
FIG. 1 shows the three stage process.

FIG. 1 of the accompanying drawings shows the three stage process; A) a method for applying a building material such as expanding foam on 3D surfaces; B) a method to remove excess material and shape the surfaces; and C) a method for applying a finishing treatment to the surface. A robot arm (4) is positioned in front of the surface to be treated (5), in the first stage a mixing nozzle (6) is used to mix and spray a two part expanding foam and binder onto the wall to form an insulating barrier (7). In the second stage a forming head, e.g. a cutting tool (8) is used to remove excess material and add details to the foam (7), e.g. the outline of brickwork. In the final stage a finishing head (10) is used that applies a sealant and surface coat (11).

Figure 2:
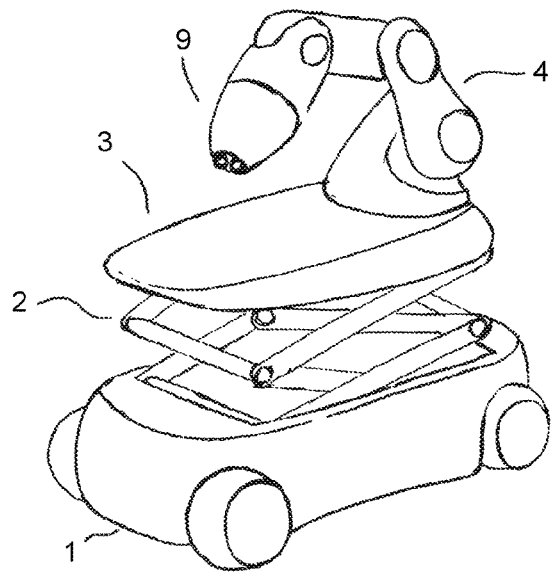
FIG. 2 shows a robot arm and head mounted on a movable platform.

FIG. 2 of the accompanying drawings shows a moveable platform (1), which includes the means to raise the height via a scissors lift (2), onto which is mounted a platform (3) for the robot arm (4). The robot arm allows for fine control of the head (9) position, once the movable platform is in position.

Figure 3:
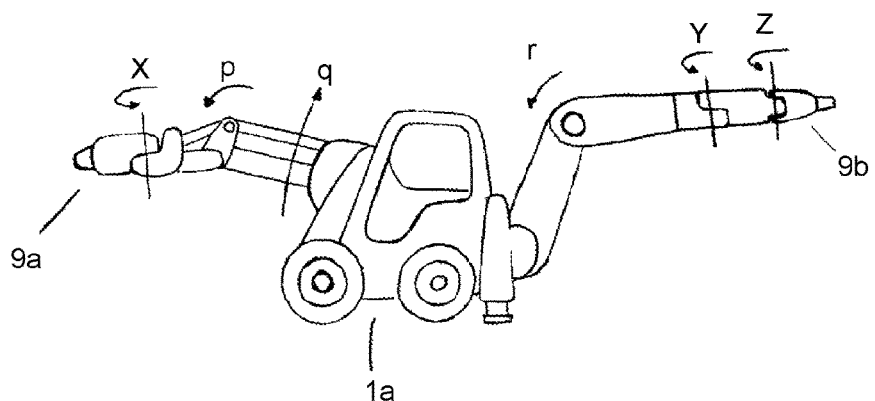
FIG. 3 shows a third party vehicle adapted to suit the invention.

FIG. 3 of the accompanying drawings shows a vehicle (la) which has two mounting points for tools (9*a*) & (9*b*). Spray, cutting or finishing heads can be connected and driven from the vehicle. They may be moved in one or more planes, to extend the range of movement and preferably in at least one axis perpendicular to the vehicle's existing arms to allow for full control of the movement of the head. For example head (9*a*) is mounted on an arm which can pivot on an axis (X), which is perpendicular to the range of movement of the vehicle (p, q). Similarly the second head (9*b*) is mounted on an arm with two axis (Y, Z) which are perpendicular to the vehicles own range of movement (r).

Figure 4:
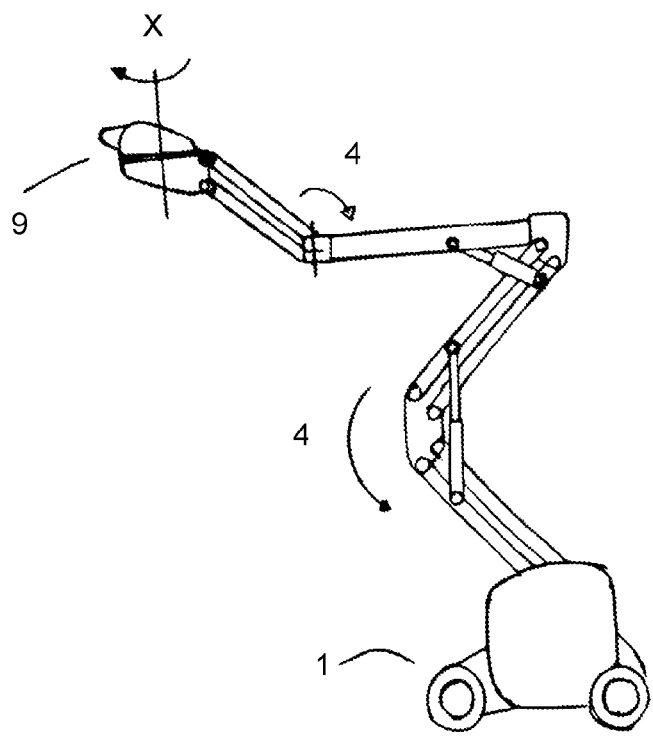
FIG. 4 shows a third party vehicle adapted to suit the invention.

FIG. 4 of the accompanying drawings shows a vehicle (1) which can raise the height of the head (9) which is attached to the vehicle through a platform that can rotate about axis (X). The vehicle can raise the height of the platform and move it back and forward by extending or retracting the arm. The head's axis of movement (X) is perpendicular to the vehicles arm (4) to provide additional control.

Figure 5:
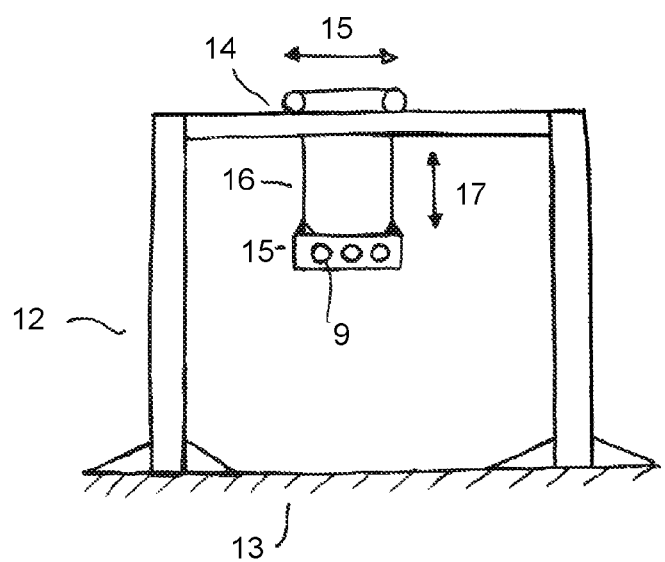
FIG. 5 shows a platform suspended below a frame.

FIG. 5 of the accompanying drawings shows a frame or scaffolding that is erected around the building (12) on the ground (13). A moveable platform (14) can move along the cross beam (15) below which on wires (16) is suspended a second platform whose height can be adjusted (17). A series of heads (9) to fulfil the different functions are mounted on the platform.

Figure 6:
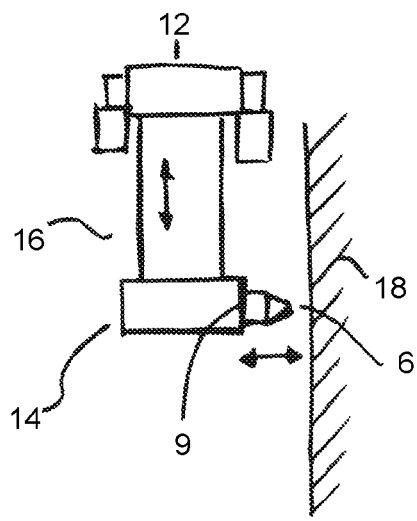
FIG. 6 shows the suspended platform from the side.

FIG. 6 of the accompanying drawings shows the platform (14) shown from the side, where it is suspended from another platform (12) on wires (16) in front of the wall (18). The head (9) may be moved towards or away from the wall (18) to get the tool (6) the required distance from the wall.

Figure 7:
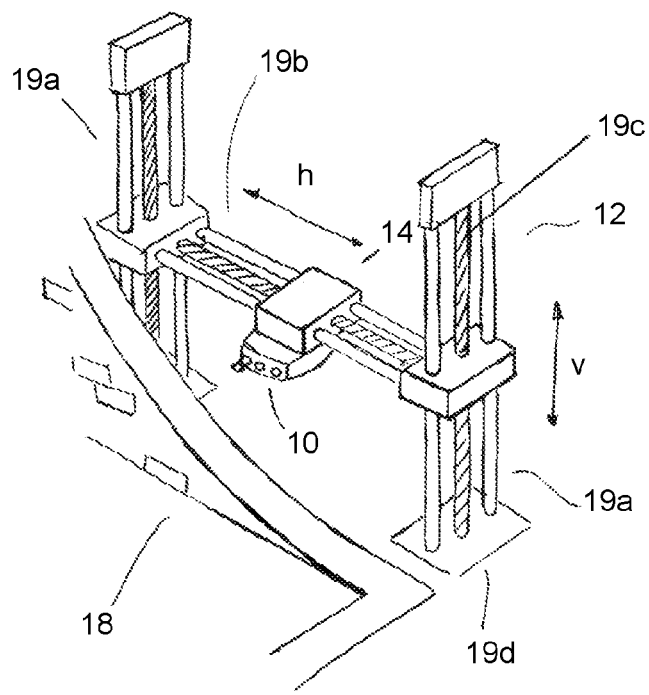
FIG. 7 shows a platform mounted on a frame.

FIG. 7 of the accompanying drawings shows a frame (12) made up of linear sliders or bearings (19*a*) and a horizontal slider (19*b*) positioned in front of a wall (18). The platform (14) is able to move horizontally (h) and vertically (v) on the frame. A lead screw or threaded rod (19*c*) is shown on the frame to allow the platform to be moved in either plane. Alternatively other power transmission methods may be used such as belt drives, gears and pulleys, pneumatics or hydraulics. The platform may be moved manually or automatically using motors or other power sources. One or more tools (6,8,10) can be mounted on the platform. The frame sits on a base (19*d*) to provide stability.

Figure 8:
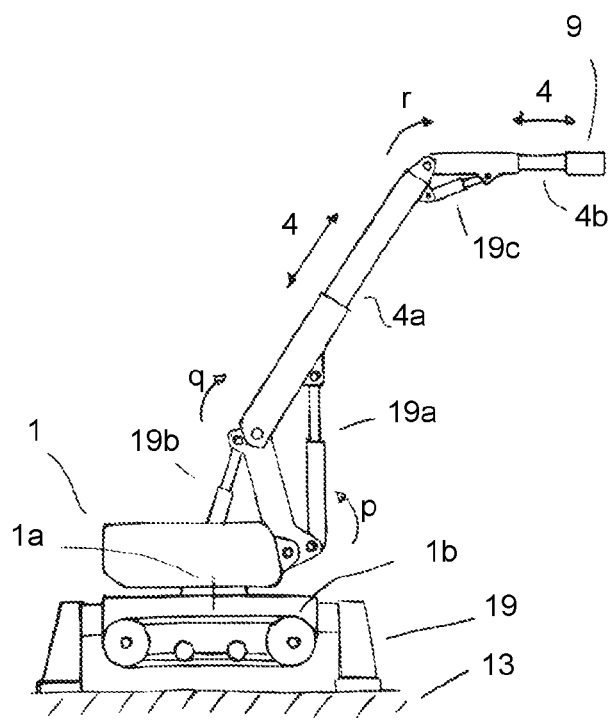
FIG. 8 shows a vehicle that uses telescopic arms.

FIG. 8 shows a vehicle (1) which can manoeuvre into position on tracks (1*b*). Alternatively the vehicle may be lifted into position or use wheels, actuated legs or other means to manoeuvre into position. The vehicle is shown raised above the ground (13) on stabilising legs (19). The vehicle has an arm with multiple segments that can rotate around one or more points (p,q,r) using hydraulic or pneumatic actuators (19*a*, 19*b*, 19*c*). The vehicle can also rotate around its base (1*a*) in a plane perpendicular to the other axis. One or more telescopic arms (4*a*, 4*b*) can be used extend the arm (4) to move the head (9) into position.

Figure 9:
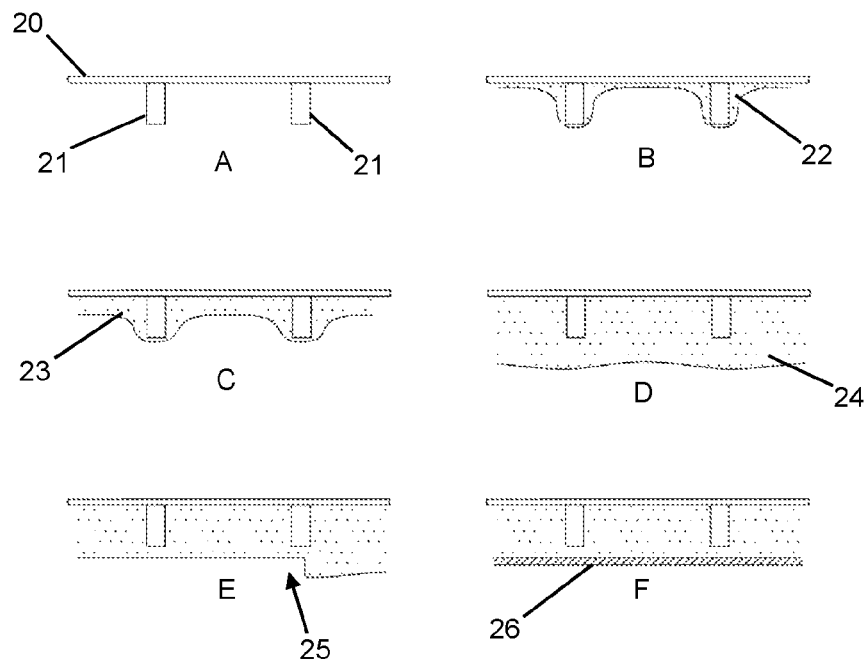
FIG. 9 shows the additive, subtractive, additive manufacturing process over 6 steps for a horizontal surface such as a ceiling or floor.

FIG. 9 of the accompanying drawings shows the additive, subtractive, additive manufacturing process over six steps (A-F) for a horizontal surface such as a ceiling or floor; consisting of floorboards (20) supported by joists (21); where an expanding insulation material such as polyurethane is applied in multiple layers (22, 23, 24) typically in depths of 25-50 mm each application; until the joists and floorboards are covered and the required depth is achieved (typically 75-150 mm); excess material is removed (25), before a protective finishing treatment such as polyurea is applied (26).

Figure 10:
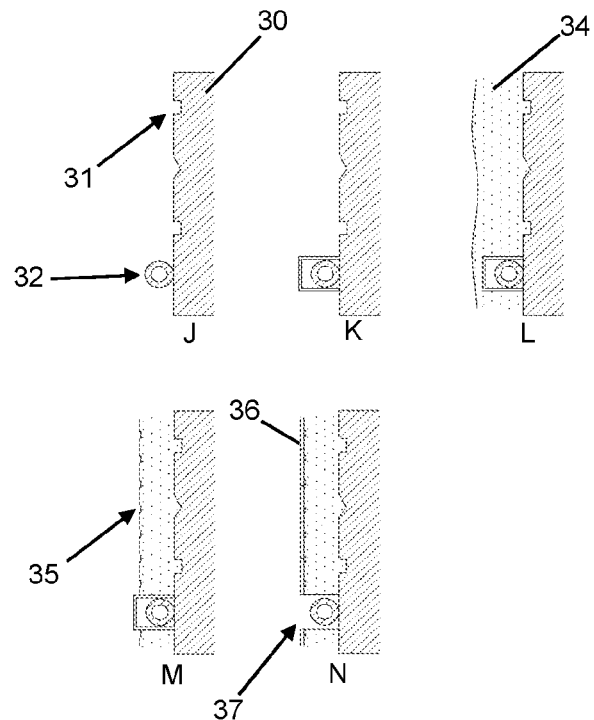
FIG. 10 shows the additive, subtractive, additive manufacturing process over 5 steps for a vertical surface such as a wall.

FIG. 10 of the accompanying drawings shows the additive, subtractive, additive manufacturing process over five steps (J-N) for a vertical surface such as an external wall; a substrate (30) in this case a brick wall with detailing (31) and architectural features such as drains (32); which can be protected using covers (33); has an expanding insulation material such as polyurethane (34) applied in one or more layers until the required depth is achieved, typically 50-200 mm; excess material can then be removed and architectural details added (35); a protective finish such as polyurea applied or decorative coatings, paint or tiles (36) applied and covers removed to reveal architectural features (37).

Figure 11:
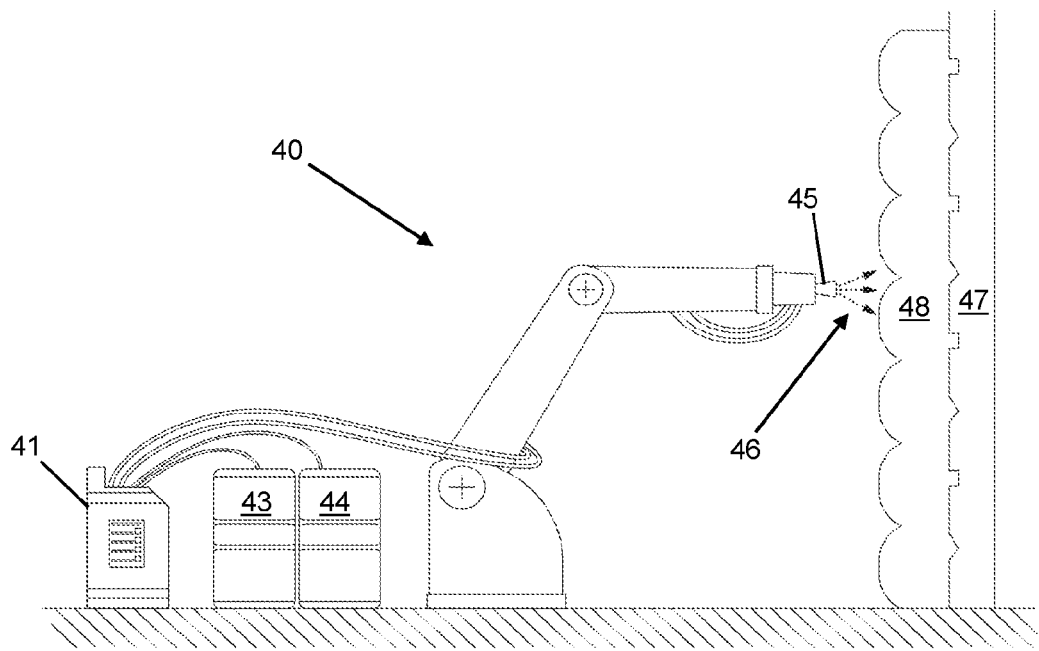
FIG. 11 shows the spray equipment and robotic manipulator.

FIG. 11 of the accompanying drawings shows a computer controlled device (40) supplied with a rapidly expanding insulation material from a reactor (41); connected by an umbilical cord consisting of two hoses for the insulation and one for compressed air (not shown); the reactor controls the flow under pressure of two chemicals isocyanates (43) polyol (44) which when combined in the spray nozzle (45) react to make polyurethane, and a mixture of other chemicals, including catalysts (which help the reaction to occur), flame retardants, blowing agents and surfactants; the pressure of the supplied chemicals causes the rapidly expanding foam to be sprayed (46) onto the substrate (47) and expanding and setting in an insulative layer (48).

Figure 12:
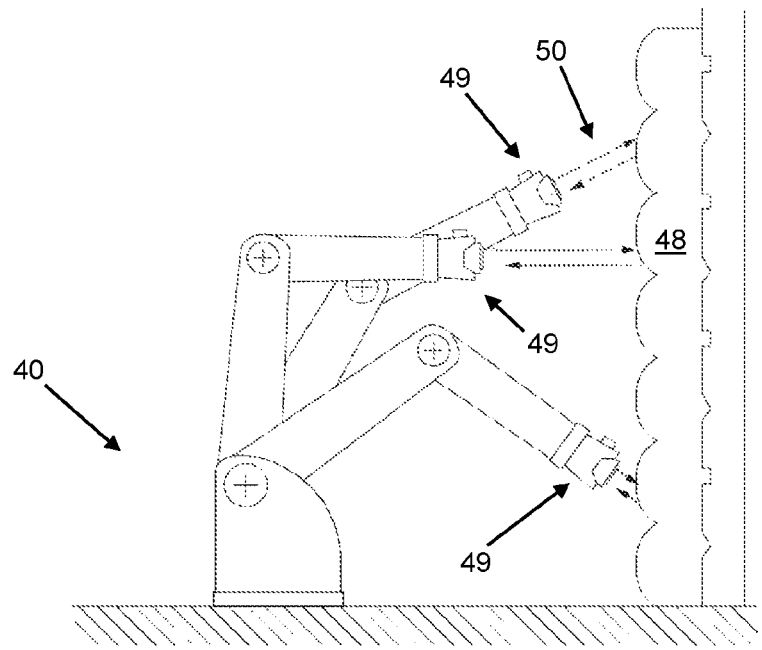
FIG. 12 shows a computer controlled device using a laser range finder to measure the depth of insulation applied.

FIG. 12 of the accompanying drawings shows a computer controlled device (40) in different positions; with a laser range finder attached (49); which provides distance feedback

(50) to the surface of the foam (48); if the distance before and after each layer is measured and the position of the computer controlled device known then the depth of the insulation can be calculated and used to control subsequent applications of the material being applied.

Figure 13:
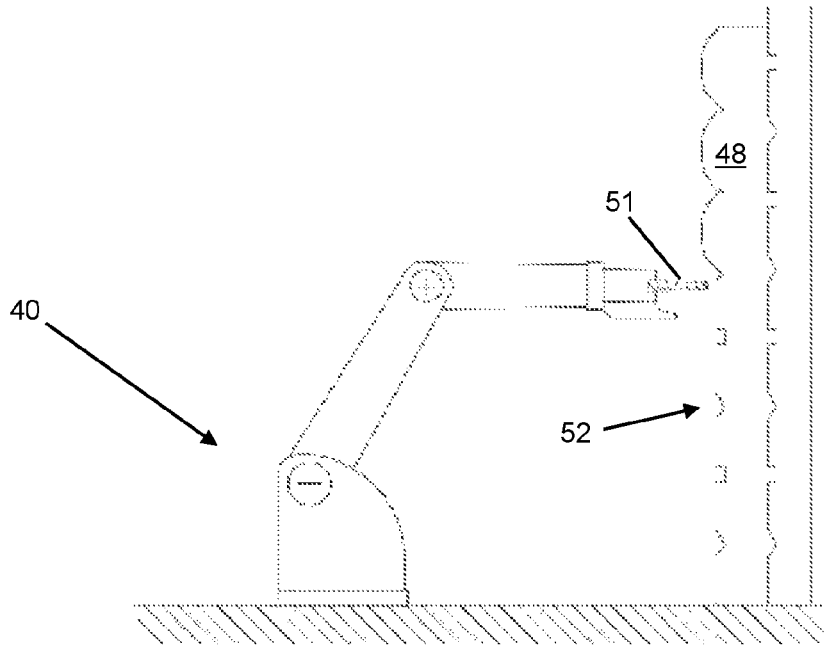
FIG. 13 shows the removal of excess material suing a cutting tool mounted to a computer controlled device.

FIG. 13 of the accompanying drawings shows one embodiment of the subtractive stage where a computer controlled device (40); with a cutting tool (51); is used to shape the material applied (48); to the required depth and leaving architectural details (52). By scanning the original details of the underlying surface the same details can be applied to the resulting surface.

Figure 14:
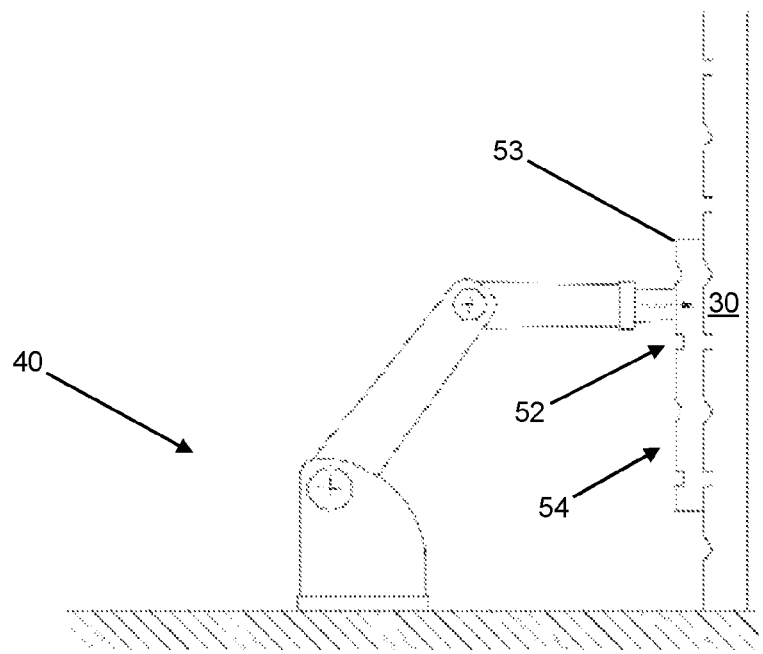
FIG. 14 shows the application of foam where the shape is controlled using a mould and the first two stages are combined; application and shaping.

FIG. 14 of the accompanying drawings shows the first two stages combined where a computer controlled device (40); applies insulation through a mould (53); which is positioned on the surface of the substrate (30); and may include architectural details (52); which can be repeated, each time leaving a pre shaped insulation panel in place (54).

Figure 15:
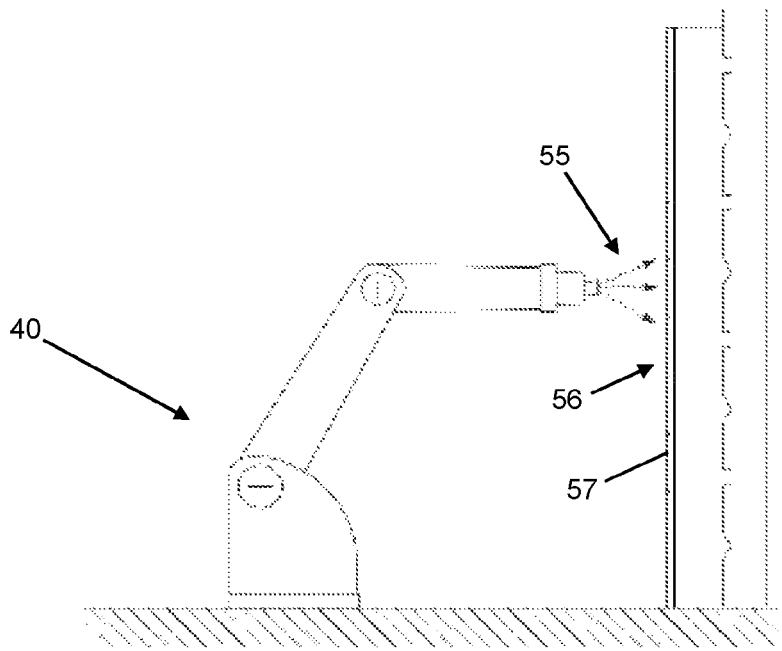
FIG. 15 shows the finishing treatment being applied.
Figure 16:
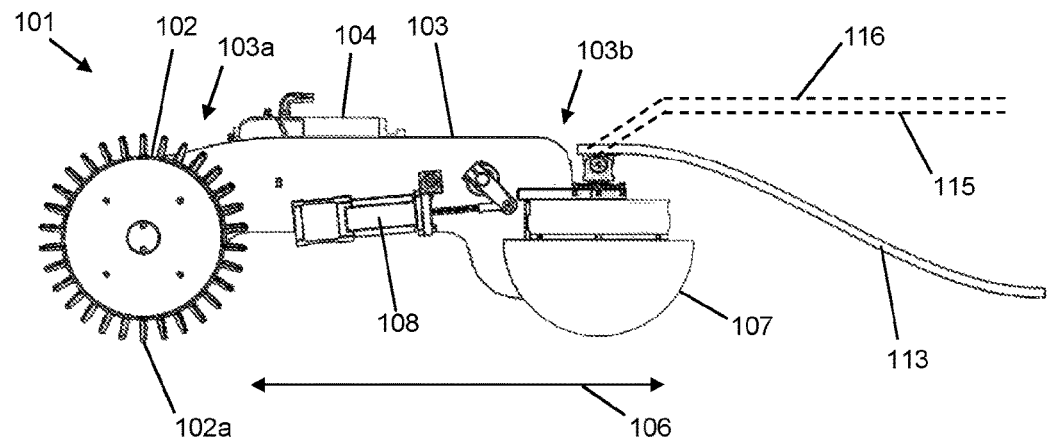
FIG. 16 shows a side elevation of a robot for spraying thermal insulation foam in accordance with an embodiment of the invention.
Figure 17:
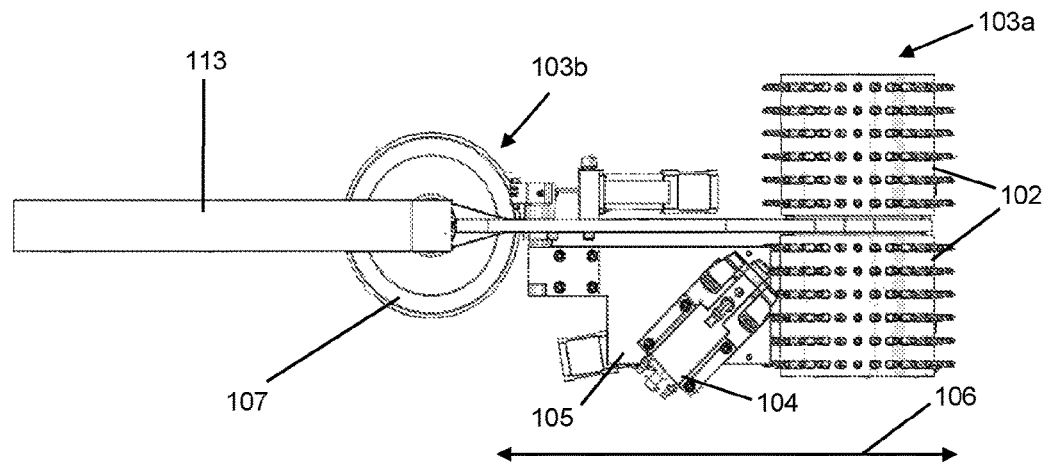
FIG. 17 shows a plan view of the robot of FIG. 16.
Figure 18:
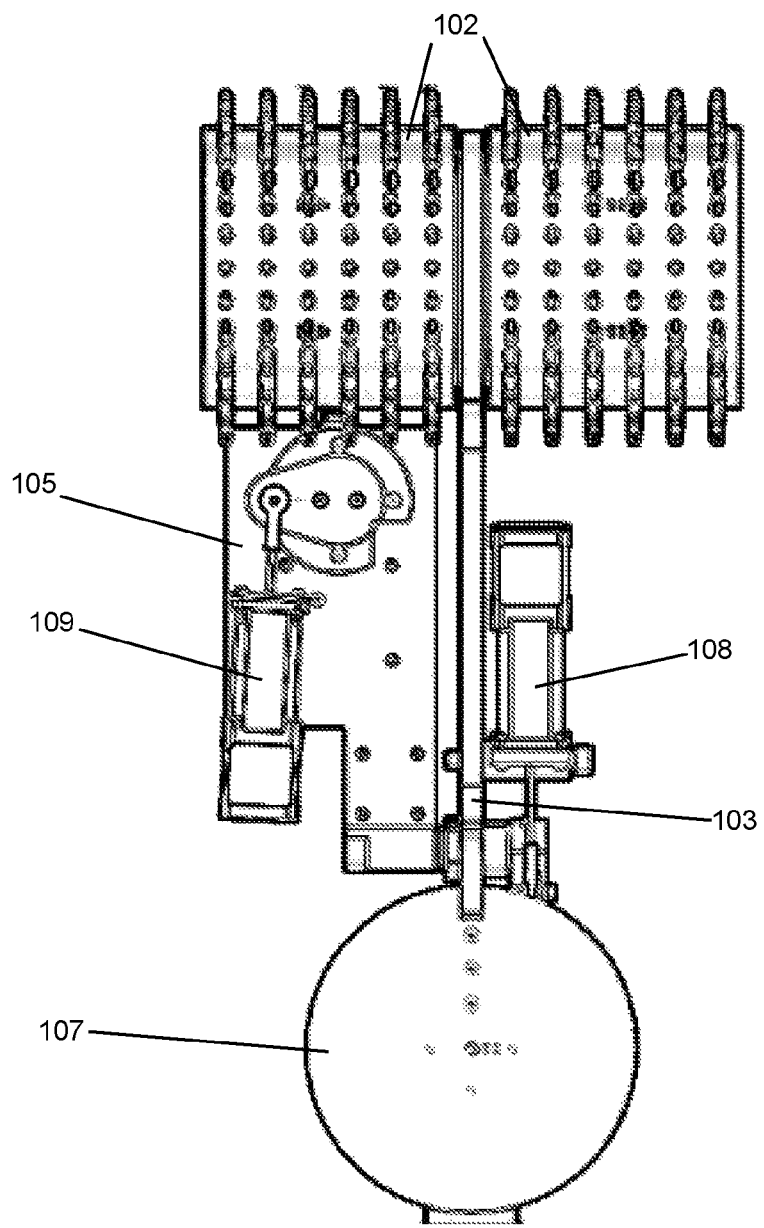
FIG. 18 shows an underside plan view of the robot of FIG. 16.
Figure 19:
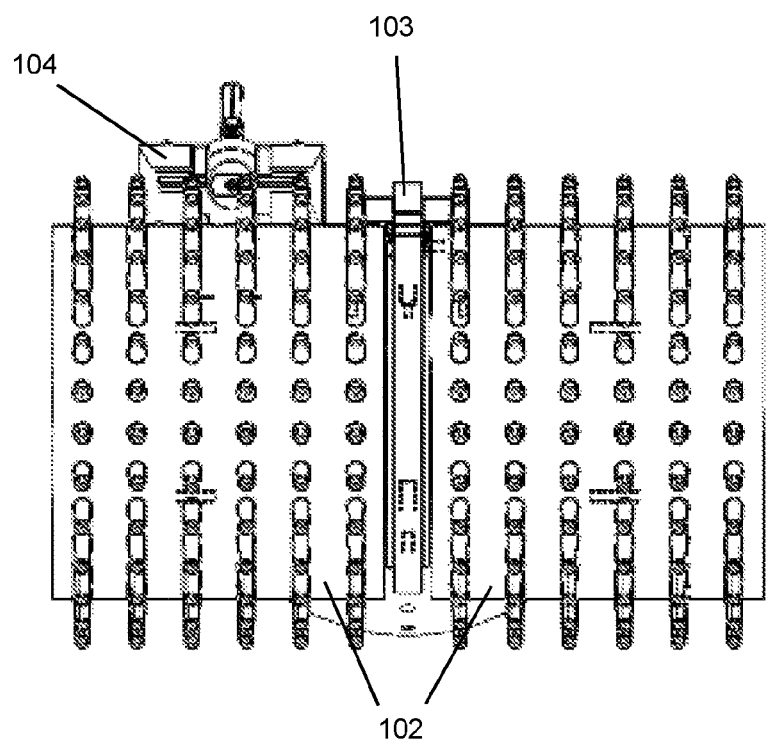
FIG. 19 shows a front elevation of the robot of FIG. 16.

FIG. 15 of the accompanying drawings shows the final stage, a computer controlled device (40); sprays a finishing treatment such as polyurea (55) onto the finished surface (56); optionally paint, covers or tiles (57) may be applied to achieve the desired aesthetic effect.

FIGS. 16 to 25 of the accompanying drawings show a robot 101 that can be used to spray thermal insulation foam (such as polyurethane). The robot 101 comprises a pair of wheels 102 mounted at the front end of an elongate chassis 103. The chassis has a long axis 106 running from the front end 103a of the chassis 103 towards the rear 103b. At the rear 103b of the chassis 103, there is provided a hemispherical shell 107; this provides a bearing surface which is dragged over the surface under the robot (and so removes the need to provide further wheels at the rear of the chassis 103).

Figure 20:
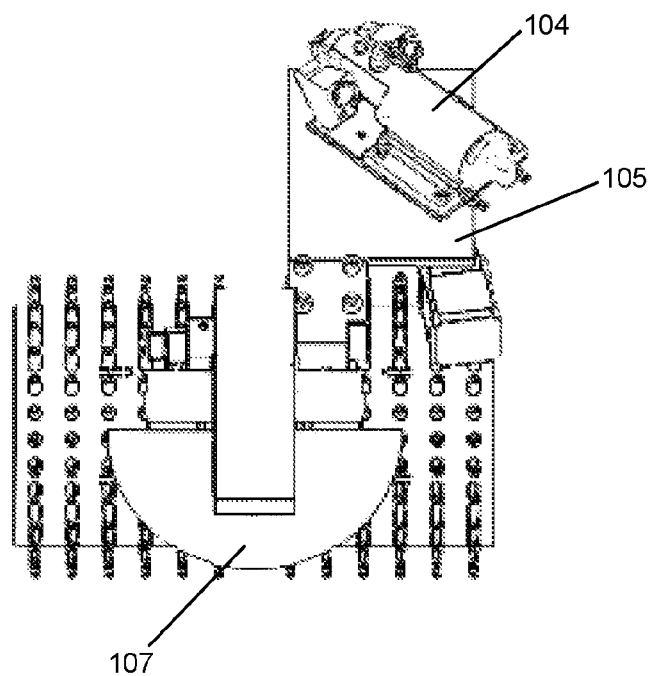
FIGS. 20 and 21 show rear elevations of the robot of FIG. 16, with the spraying arm in different positions.
Figure 21:
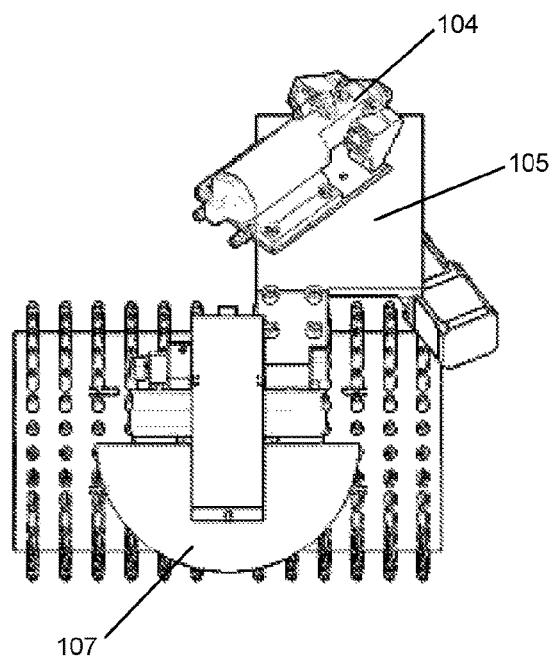
Figure 22:
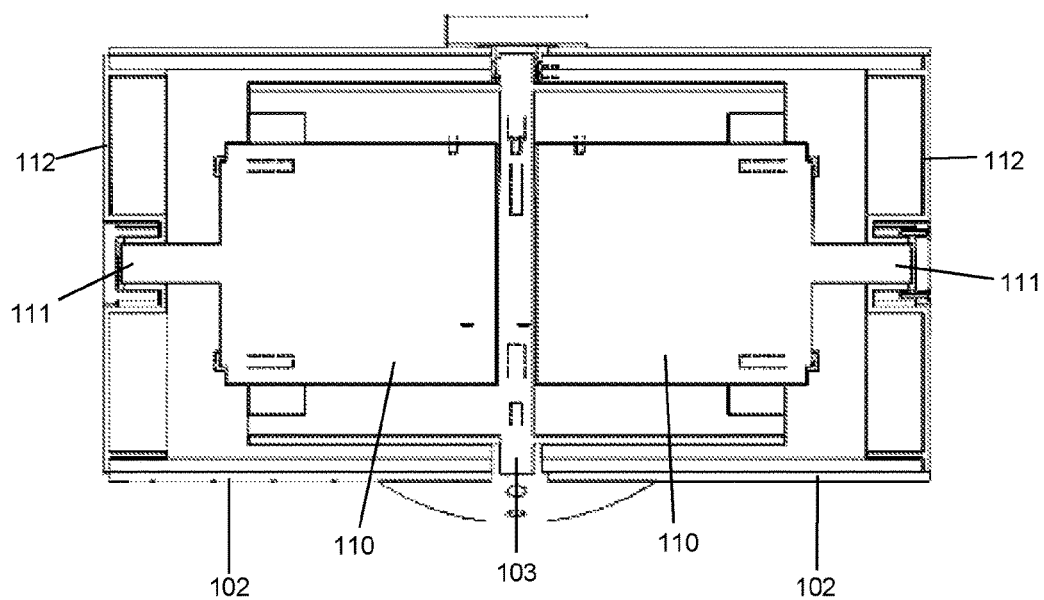
FIG. 22 shows a cross section through the wheels of the robot of FIG. 16.
Figure 23:
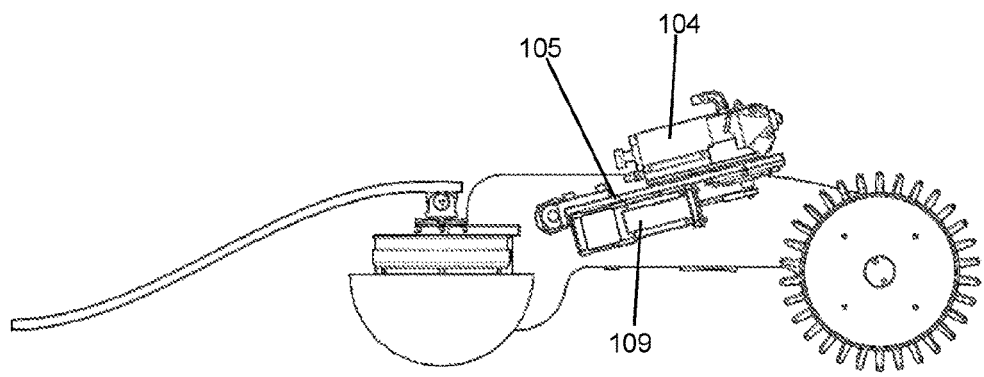
FIGS. 23 to 25 show side elevations of the robot of FIG. 16, with the spraying arm at different elevations.
Figure 24:
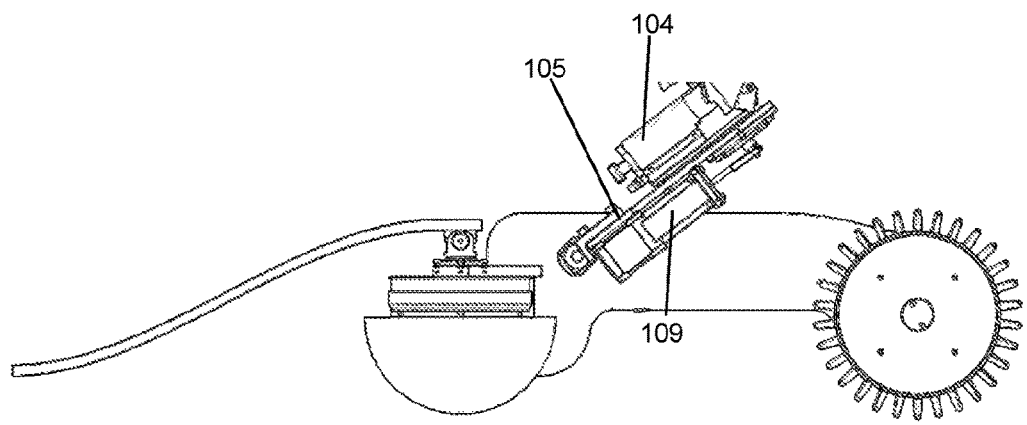
Figure 25:
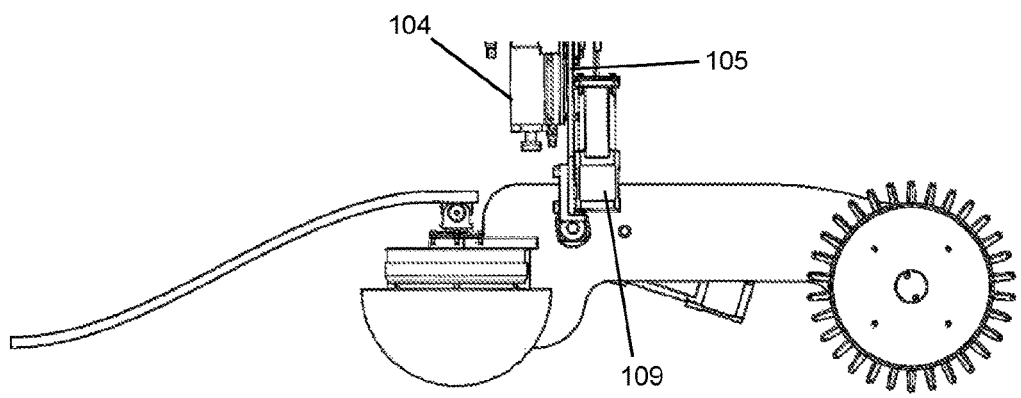

The chassis 103 also supports a spray nozzle 104 mounted on the chassis 103 through a spray arm 105. The spray arm allows both the angle of elevation of the spray nozzle to be varied (as shown in FIGS. 23 to 25 of the accompanying drawings) and the azimuthal angle of the spray nozzle to be varied (as shown in FIGS. 20 and 21 of the accompanying drawings). The movement in both directions is caused by actuators 108, 109. Thus, the spray nozzle 104 can be pointed in any direction over a substantial solid angle above the robot 101, and so the robot 101 can be used to spray a large area surrounding itself.

In order to mount the wheels 102 on the chassis 103 and to drive the wheels, each wheel 102 is provided with a motor 110 mounted on the chassis 103. An output shaft 111 of each motor 110 engages a hub 112 of the respective wheel 102. Thus, the motors 110 not only directly drive each wheel 102, but they provide the support for the wheels 102 without any intervening drive train. This reduces weight and complexity, and also is efficient use of space as the motors 110 are housed within the wheels 102. The wheels 102 can therefore rotate with the output shafts 111 about a horizontal axis perpendicular to the length 106. The direction of travel of the robot 101 can be controlled by controlling the relative rotational speeds of the wheels 102. Spikes 102a on the wheels improve traction and allow the wheels 102 to overcome obstacles that might be encountered.

The robot 101 is also provided with a tail 113, which is mounted at the rear 103b of the chassis close to the centre of the hemispherical shell 107. The tail 113 is mounted on the chassis 103 through a clutch 114. It also provides a connection for wires 115 which provide power and control signalling for the motors 110 and actuators 108, 109, and a source of the insulation foam to be sprayed, by means of supply pipe 116. Supply pipe 116 is heavy, semi-rigid and an obstacle to movement or agility. We have been able to employ its shortcomings for our benefit, as it is used as balance, support and grounding, so that a second set of wheels is not necessary. The clutch 114 allows the robot to reverse easily while 'looping' the hose sideways (therefore not pushing it into the wall etc.) in one instance, have a rigid straight tail in another (while trying to keep a straight line forward) or drag excess hose into a smaller cavity to avoid catching the sleeper wall or an obstacle. In order to loop the supply pipe 116, the robot is reversed using one wheel 102 into the tail 113, clutch 114 loose. The clutch 114 is then locked and the wheels 102 driven so as to straighten up the robot. This gives about a meter of hose looped to one side of the robot. The clutch can again be released and the robot moved forward, leaving most of the cable stationary until it tightens. This works very well in localised spraying or positioning in preference to dragging the whole 8-10 m of the heavy hose. It can be seen that the chassis 103, the spray arm 105 and nozzle 104 when aligned flat against the chassis 103 and the actuators 108, 109 all fit within the cross section of the wheels 102. Thus, the robot 101 is of relatively low profile, and so can move around a cavity into which a human operator would not be able to fit. As such, this means that cavities such as underfloor cavities can be insulated much less intrusively—in the underfloor cavity example, there is no longer any need to lift all of the floorboards in a room, merely enough to allow access to the robot into the cavity.

Figure 26:
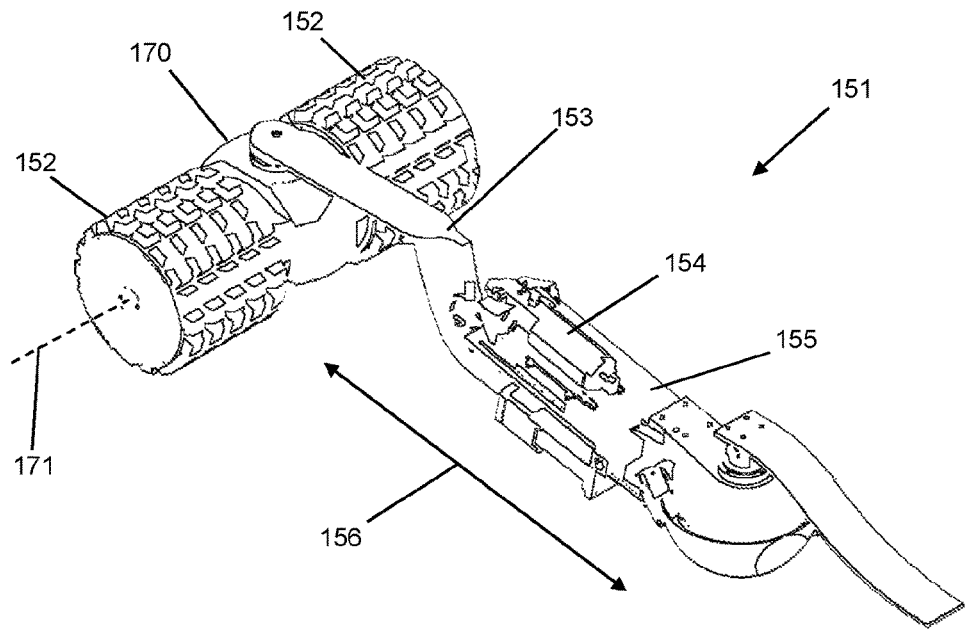
FIG. 26 shows a perspective view of a thermal insulation spraying robot in accordance with an embodiment of the invention, in a first position.
Figure 27:
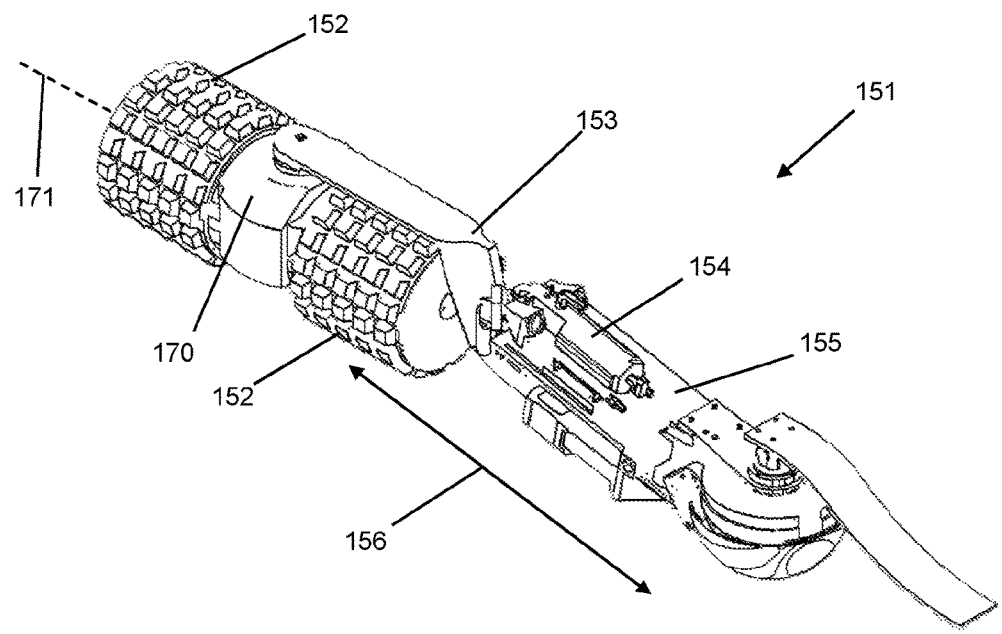
FIG. 27 shows a perspective view of the robot of FIG. 26 in a second position

A robot 151 in accordance with a further embodiment of the invention is shown in FIGS. 26 and 27 of the accompanying drawings. Equivalent features to those of the first embodiment have been indicated with corresponding reference numerals, raised by 50. In this embodiment, rather than being mounted for rotation relative to the chassis 153, the wheels 152 are mounted on a wheel mounting member 170, which is pivotally mounted on the chassis 153. This means that the wheels can be positioned in two positions, shown in FIGS. 26 and 27 respectively.

In the first position, shown in FIG. 26 of the accompanying drawings, the common axis of rotation 171 of the wheels is horizontal and perpendicular to the length 156 of the chassis 153. The wheels 152 function as described above with reference to the first embodiment of the invention to drive the robot 151.

In the second position, shown in FIG. 27 of the accompanying drawing, the wheel mounting member 170 has rotated relative to the chassis 153 (either through the action of an actuator within the wheel mounting member 170 or by unlocking the mounting member 170 relative to the chassis 153 and driving wheels 152 in opposite directions) about an vertical axis. Accordingly, the axis of rotation 171 of the wheels 152 is now aligned parallel with the length 156 of the chassis 153. The maximum cross section of the robot 151 in any plane perpendicular to the length 153 is reduced with respect to the first embodiment of the invention.

The robot 151 may also be provided with a manipulator arm, which allows the robot to lift or push wires and other moveable hazards, particularly suspended ones, out of its way (and possibly secure them to the floor). This can be a simple rigid arm mounted pivotally on the chassis 153 and having an actuator to control its movement. It may be provided with a hook or a fork at the end distal from the chassis 153. Alternatively, this could be carried out by the spray arm 155, which could be used to lift hazards out of the way of the robot.

The use of the robots 101, 151 of the two embodiments described above can be demonstrated in accordance with FIGS. 28 to 30 of the accompanying drawings.

Whilst we will refer to the robot 151 of the further embodiment of the invention, the robot 1 of the first aspect of the invention could be used in its place.

Figure 28:
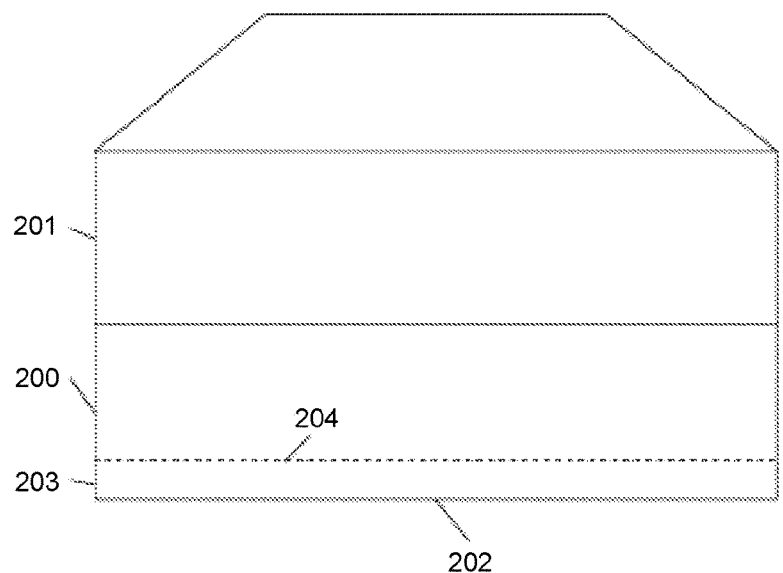
FIG. 28 shows a schematic cross section through a house that is to have a cavity insulated in accordance with a method in accordance with an embodiment of the invention.
Figure 29:
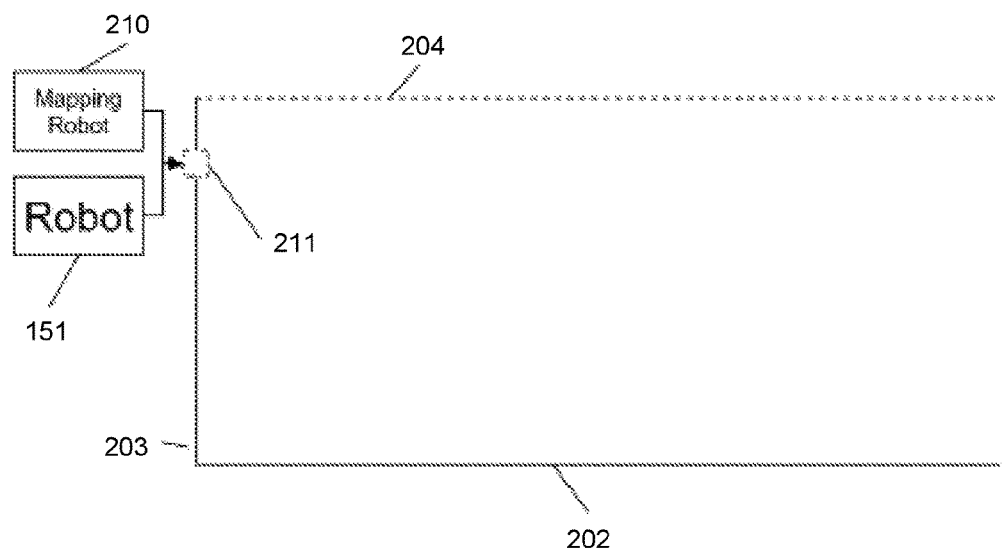
FIG. 29 shows an enlarged cross section through the cavity of the house of FIG. 28.

FIG. 28 shows a house having two storeys 200, 201 and an underfloor cavity 202 beneath the lower floor 200. It is desired to insulate the walls 203, 204 of the cavity 202 in order to improve the thermal performance of the house. The upper walls 204 are a suspended wooden floor formed of wooden floorboards supported on joists.

Figure 30:
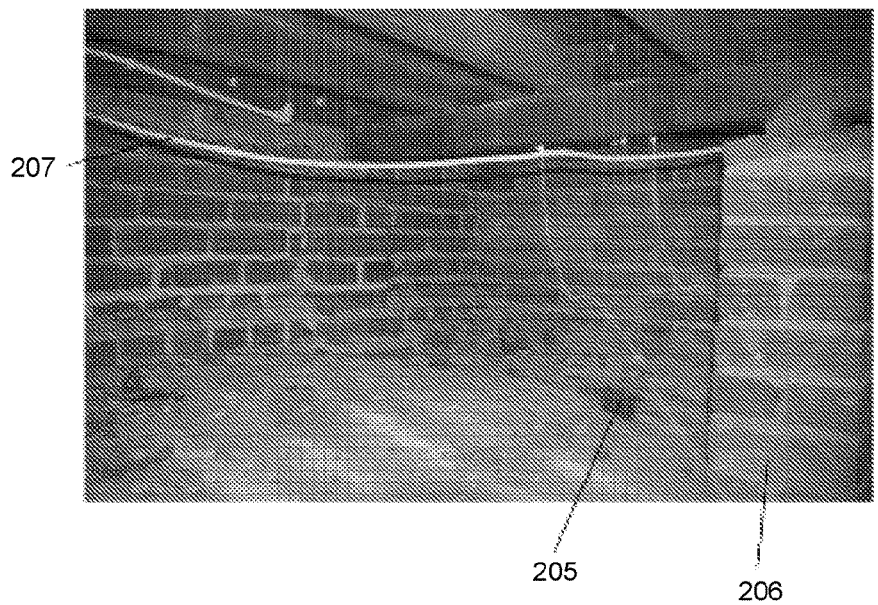
FIG. 30 shows a perspective view of the inside of the cavity.

The cavity is generally of the order of 20-50 cm high, and so is tricky to access. Furthermore, as seen in FIG. 30 of the accompanying drawings, debris 205, wires 207 and protruding brickwork 206 all make movement within the cavity difficult. The following method, in accordance with a further embodiment of the invention, may make the act of insulating such cavities (much) easier, quicker and more cost effective.

In the first step, access is allowed into the cavity for a mapping robot 210. This can be by making a hole 211 in a wall 203 of the cavity 202. In this embodiment, the hole 211 is in an exterior wall 203, which has the advantage that it is not necessary to disturb the occupant of the house (with the consequent removal of floors, carpets etc.). Alternatively, sufficient floorboards can be raised to allow the mapping robot access 110. This will generally be significantly fewer than would be required to gain access to the entire cavity by a human user.

The mapping robot 210 is similar in function to the robot 151 discussed above, but instead of carrying a spray arm 155 and nozzle 154, it carries a camera and/or other sensing apparatus (such as an infrared camera, sonar or lidar apparatus and the like). The mapping robot traverses the cavity 202, mapping out the position of hazards (such as those 205, 206, 207 discussed above) and the general layout of the cavity. The mapping robot 210 is then retrieved through the opening 210 through which it entered the cavity 202.

Use of an infrared camera is advantageous, as, as well as mapping the cavity, the state of any wiring can be inspected to ensure that there is no wiring that is overheating and as such requiring replacement.

The resultant map of the cavity is analysed to generate a path for the spraying robot 151. The path includes a track of positions for the robot 151 to occupy, plus information as to the correct aiming of the spray nozzle 154. Typically, the path will involve the robot 151 moving to the furthest point from the point of entry, and then spraying the internal walls 203, 204 of the cavity, backing out of the cavity as it does so.

The robot 151 is then introduced into the cavity, typically through the hole 210. The robot 151 can be introduced in the second position, so that it is of relatively low profile. This means that the hole 210 can be smaller than otherwise be the case, as it only needs to be big enough for the robot 154 in the second position (and not the first position) to pass through (approximately 18 centimetres in diameter).

Once through the hole 210, the robot 154 reverts to the first position and commences spraying in accordance with the path. It will make its way gradually back towards the hole 210 and, once the suspended timber floor 204 has been appropriately sprayed, will be retrieved through the hole 210.

Thus, spraying of the cavity can be achieved without having to lift any of the floorboards, and without even disturbing the occupants of the house. This is particularly helpful for landlords with housing stock that comprises numerous older properties.

The robot 101 of the first embodiment can be used in this method; rather than making the hole 210, the robot 101 would typically be installed and retrieved by lifting sufficient floorboards to allow access to the robot. This would only be a few floorboards, typically much fewer than would be required to allow a human operative access.

Figure 31:
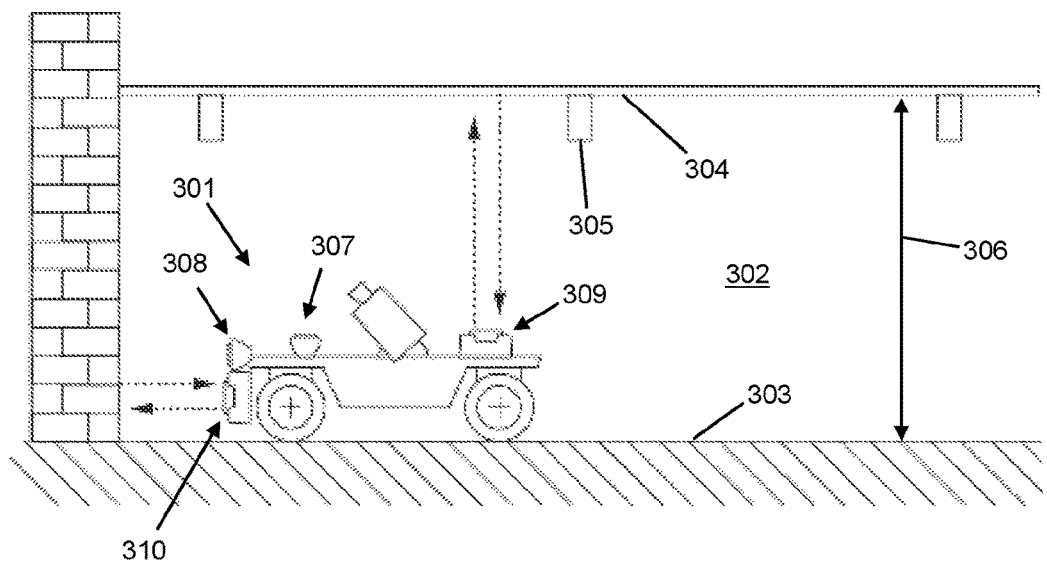
FIG. 31 shows a robotic device in a floor void before applying insulation.

FIG. 31 of the accompanying drawings shows a robotic vehicle (301) in the underfloor void (302) which exists between the ground (303) and underside of the floorboards (304) and supporting joists (305) (typically spaced on 400 mm centres), typically the height of the void (306) is 400 mm, but may range between 150 mm to 600 mm or more. One or more cameras allow the operator to view the ceiling (camera 307) or where the vehicle is moving (camera 308). One or more rangefinder sensors are mounted on the robot, such as a laser rangefinder and can be used to measure the ceiling (rangefinder 309) or locate the robot (rangefinder 310). Each laser may cover an arc in a single plane or multiple planes and can therefore be used to build up a 2D or 3D map.

Figure 32:
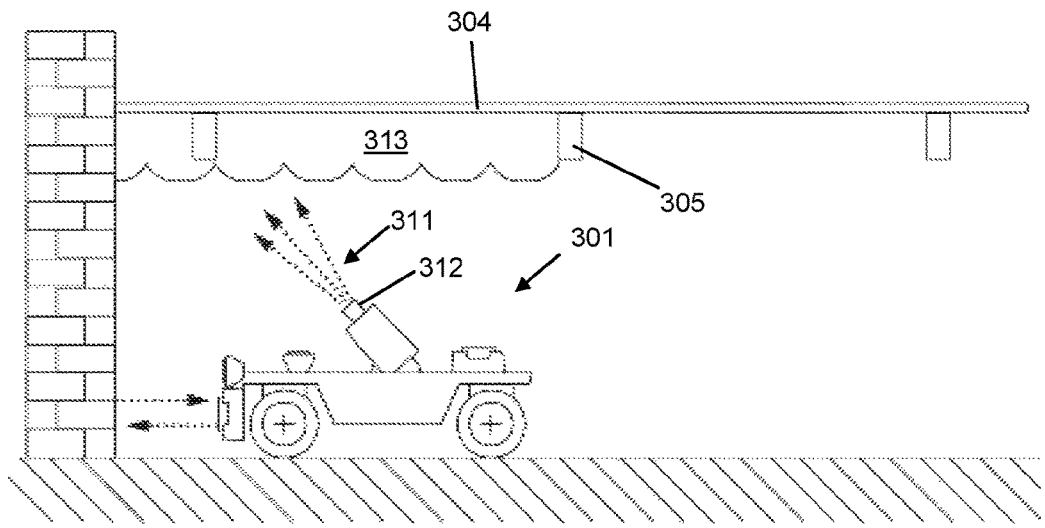
FIG. 32 shows a robotic device applying insulation.

FIG. 32 of the accompanying drawings shows the robotic vehicle (301) applying a two part expanding insulation material such as polyurethane (311) through a nozzle (312) to create a layer of insulation (313) on the underside of the floorboards (304) and joists (305). The insulation is built up in layers typically in depths of 25-50 mm each application; until the joists and floorboards are covered and the required depth is achieved (typically 100-150 mm), but can be as low as 25-50 mm if only an airtight barrier is required or as high as 200 mm if additional insulation is required.

Figure 33:
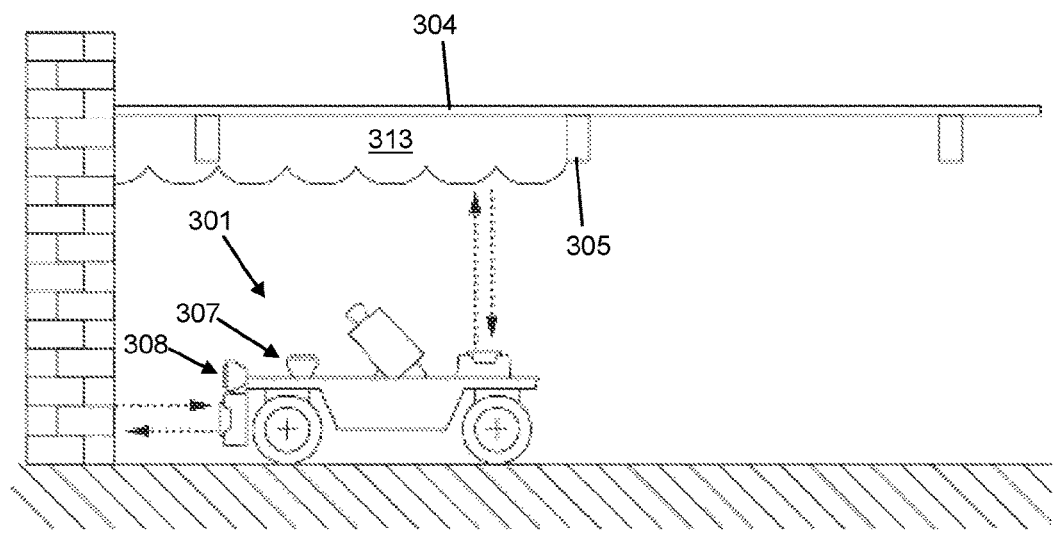
FIG. 33 shows a robotic device after applying insulation.

FIG. 33 of the accompanying drawings shows the robotic vehicle (301) after the application of insulation (313) to the underside of the floorboards (304) and supporting joists (305). One or more cameras allows the operator to view the ceiling (camera 307) and resulting coverage of insulation. By measuring the distance before and afterwards application of insulation (313) for a given position the depth of insulation can be calculated and used to determine whether further insulation is required in a given area.

Figure 34:
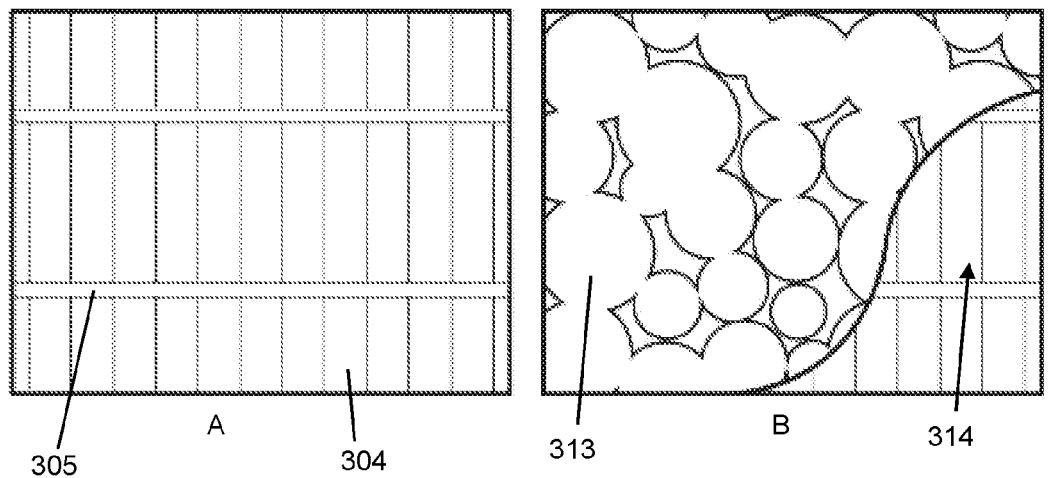
FIG. 34 shows a view from the camera before and after spraying.

FIG. 34 of the accompanying drawings shows a simplified diagram before (A) and after (B) the application of insulation from the viewpoint of the camera mounted on the robotic vehicle looking directly up at the underside of the floor. Before application of the insulation the regular and linear pattern of joists (305) and floorboards (304) contrasts with the organic texture of the insulation material (313). These patterns may be used by an operator to calculate the percentage covered and direct the robot, or processed by a computer using colour sampling and pattern recognition using simple machine learning algorithms to calculate the proportion covered with insulation (313), to the proportion left untreated (314). When combined with the depth of insulation U-Values can automatically be calculated for the floor before and after installation and used in energy savings calculations.

Figure 35:
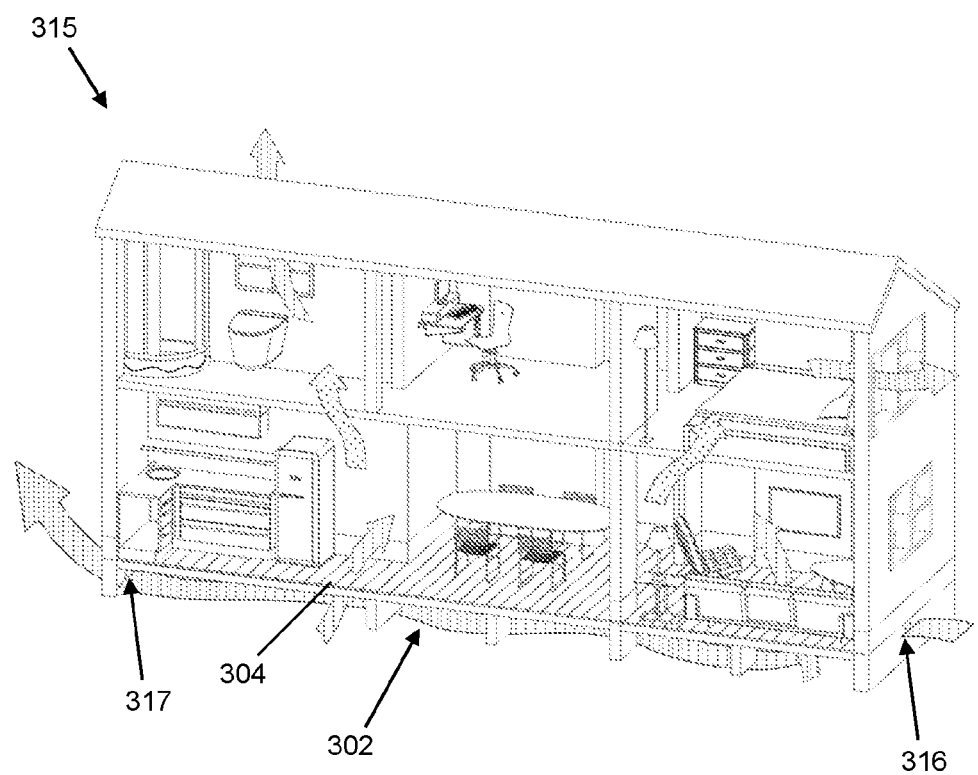
FIG. 35 shows the construction of a typical house and heat loss.

FIG. 35 of the accompanying drawings shows a typical house (315) with an under floor void (302). A number of air vents (316 & 317) allow air to pass through the void (302) allowing gasses and moisture from the ground to escape and preventing problems due to damp. Cold air from the void may rise up through the floor boards (304) and drive heat loss through the rest of the building as indicated by the arrows in FIG. 35. Therefore it is desirable to add a layer of insulation and airtight barrier to the underside of the floorboards but still allow the ground to breath.

Figure 36:
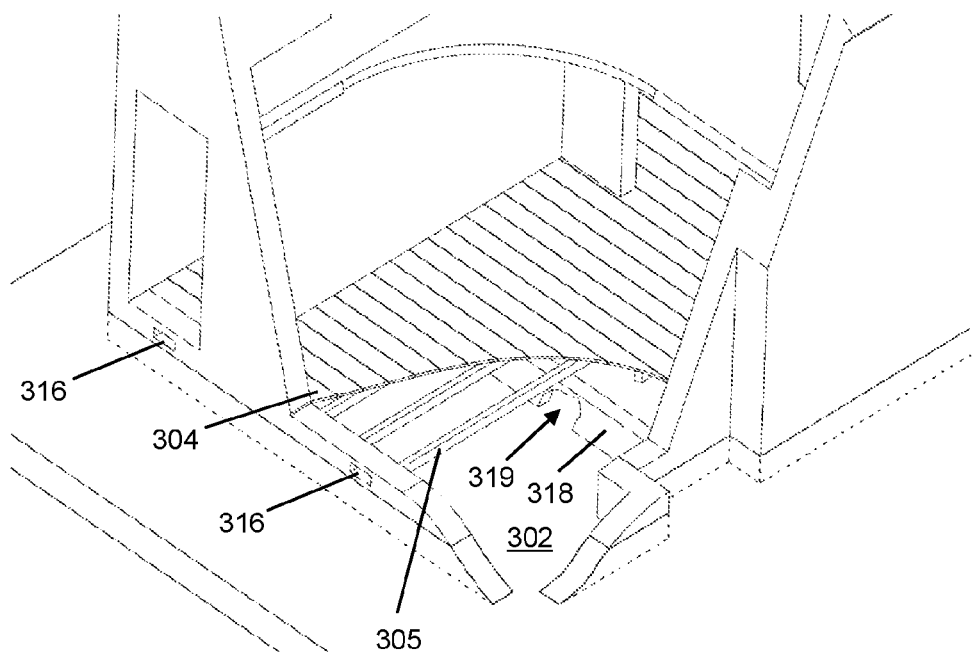
FIG. 36 shows a diagram of the floor void

FIG. 36 of the accompanying drawings shows details of the underfloor void (302). Typically the ground within the void is lower than the outside level. Air vents (316) are located periodically on the outside wall. Floorboards (304)

typically 125-250 mm wide are supported by joists (305) running perpendicular to the floorboards. The floor is shown cut away, revealing sleeper walls (318) within the void that support the joists, these may have gaps (319) in them to allow air to pass through the void.

Figure 37:
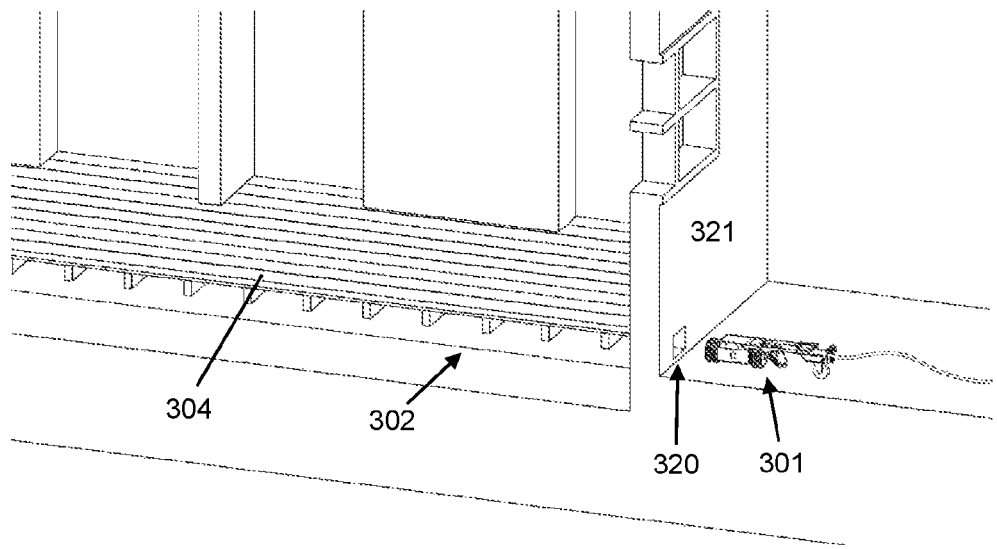
FIG. 37 shows the robotic device being inserted into the floor void

FIG. 37 of the accompanying drawings shows the robotic vehicle (301) being inserted into the void (302) from outside the building, preferably this is through an access point (320) in exterior wall (321) so disruption to the occupants is minimised and access to the property does not have to be arranged. The access point may be made on the outside wall by removing an air vent (typically 215 mm×155 mm or 215 mm×75 mm), one or more bricks (typically 215 mm×70 mm) or by drilling a core hole (diameter 100, 125 150 mm typically). Therefore the robot needs to be able to fit through a gap and deploy once inside the void if applicable. Alternatively the robot may be inserted into the void by lifting one or more floorboards (304) or through an access hatch within the property.

Figure 38:
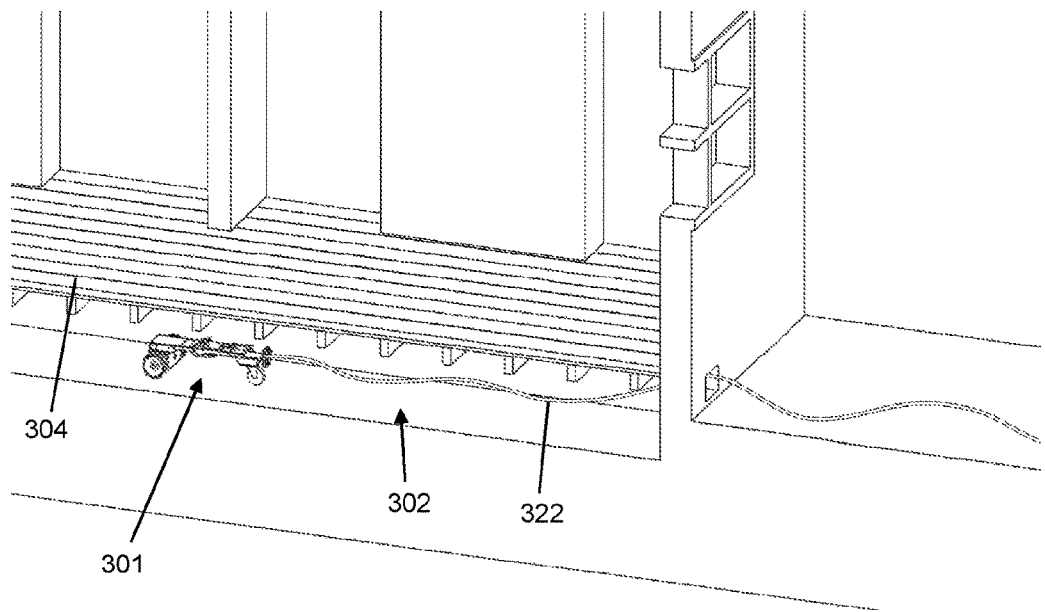
FIG. 38 shows the robotic device after deployment in the floor void

FIG. 38 of the accompanying drawings shows the robotic vehicle (301) deployed within the void (302) having successfully navigated the length of the space under the floor (304). The robotic device may carry onboard power or be supplied through an umbilical (322), or a combination of both. The robotic device may carry canisters of foam, or may be fed expanding insulation material such as polyurethane in two parts through the umbilical cord from a reactor positioned outside.

Figure 39:
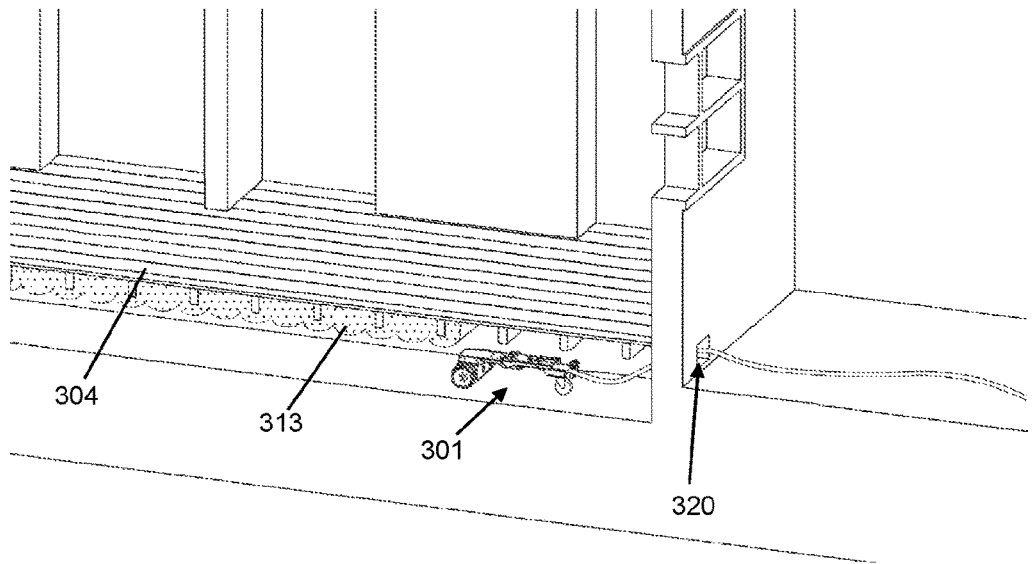
FIG. 39 shows the robotic device after the application of insulation in the floor void.

FIG. 39 of the accompanying drawings shows the robotic vehicle (301) working backwards towards the access point (320) applying insulation (313) to the underside of the floor (304).

Figure 40:
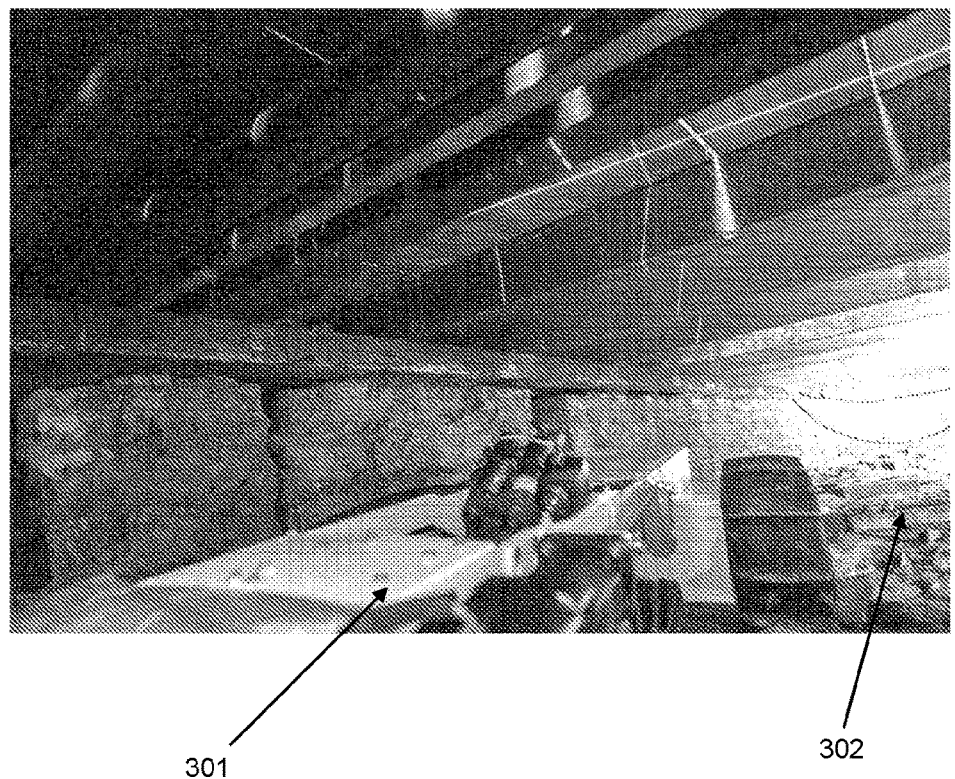
FIG. 40 shows a photo of the underfloor void.

FIG. 40 of the accompanying drawings shows a photo of the robotic vehicle (301) in position in the void (302).

Figure 41:
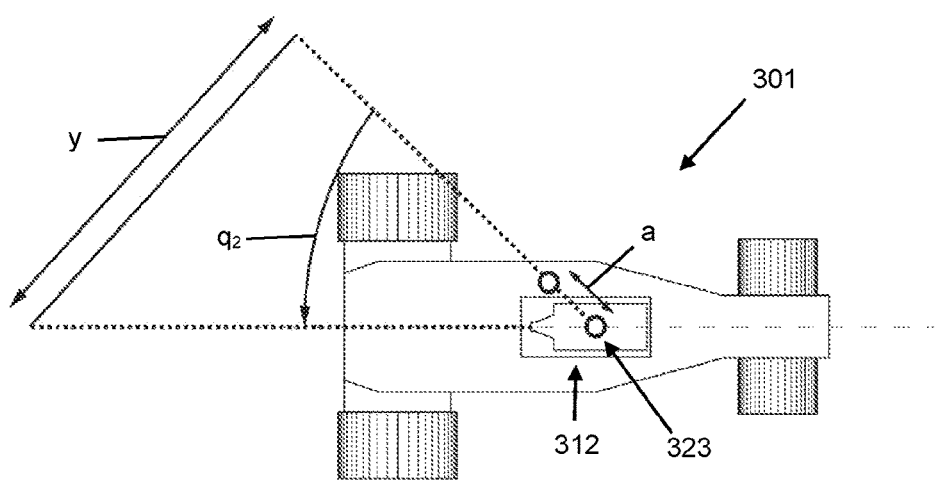
FIG. 41 shows a plan view of the spray movement.

FIG. 41 of the accompanying drawings shows a view from above of the robotic vehicle (301) showing the spray gun (312) pivoting on a vertical axis (323), where the tip of the nozzle is distance a from the pivot. As the gun rotates to angle $q_2$ sideways distance y can be calculated.

Figure 42:
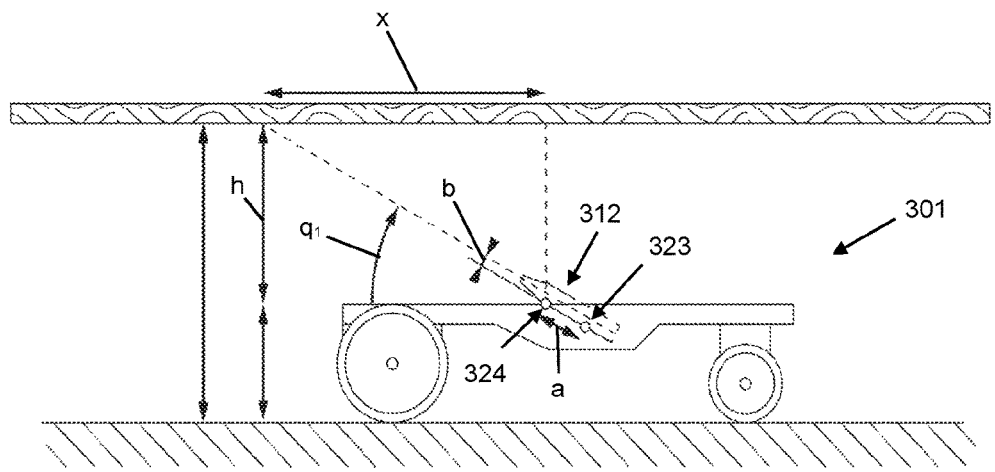
FIG. 42 shows a side view of the spray movement.

FIG. 42 of the accompanying drawings shows a sideways view of the robotic vehicle (301) showing the spray gun (312) pivoting on a horizontal axis (324), where the pivot is distance a to the vertical axis (323) and the gun nozzle is distance b above the pivot. As the gun rotates to angle $q_1$ distance x can be calculated if the height h to the top of the void is given by:

$$x = h/\tan(q_1) - b/\sin(q_1)$$

and where:

$$y = (a + \sqrt{(x^2 + h^2 - b^2)}) \tan(q_2)$$

in order to make the spray gun point to a position (x, y).

$$q_1 = \arctan[(h/x) - \arcsin(b/\sqrt{(h^2 + x^2)})]$$

$$q_2 = \arctan(y/(a + \sqrt{(x^2 + h^2 - b^2)}))$$

Figure 43:
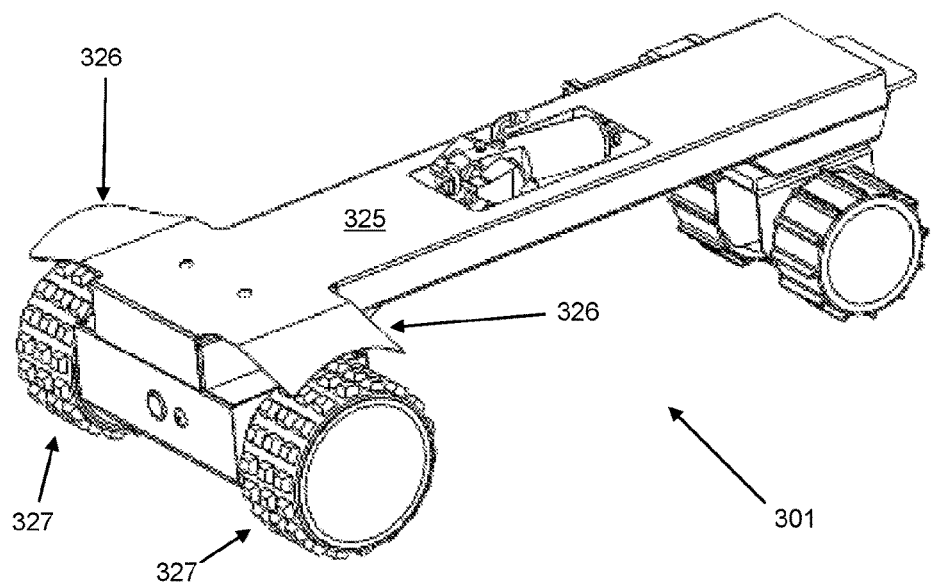
FIGS. 43 and 44 show the robotic vehicle with removable covers.
Figure 44:
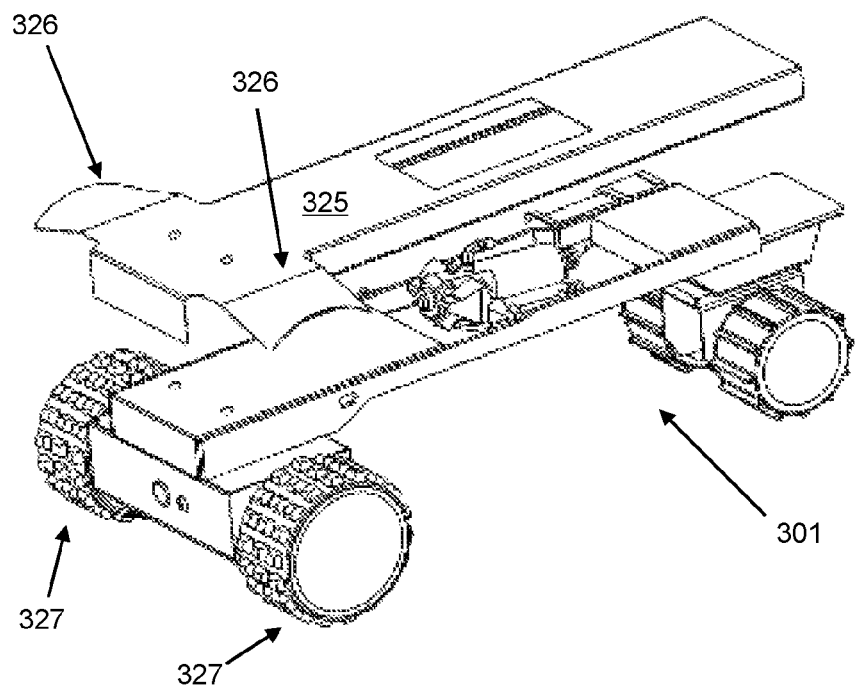

FIGS. 43 and 44 of the accompanying drawings show the robotic vehicle (301) with removable covers (325) which protect the robot and allow for easy cleaning of any material spillage. Cheap disposable covers may be used. The cover includes protection (326) for the wheels (327) to prevent any material falling from above sticking to the wheels and causing an obstruction that could prevent them turning.

Figure 45:
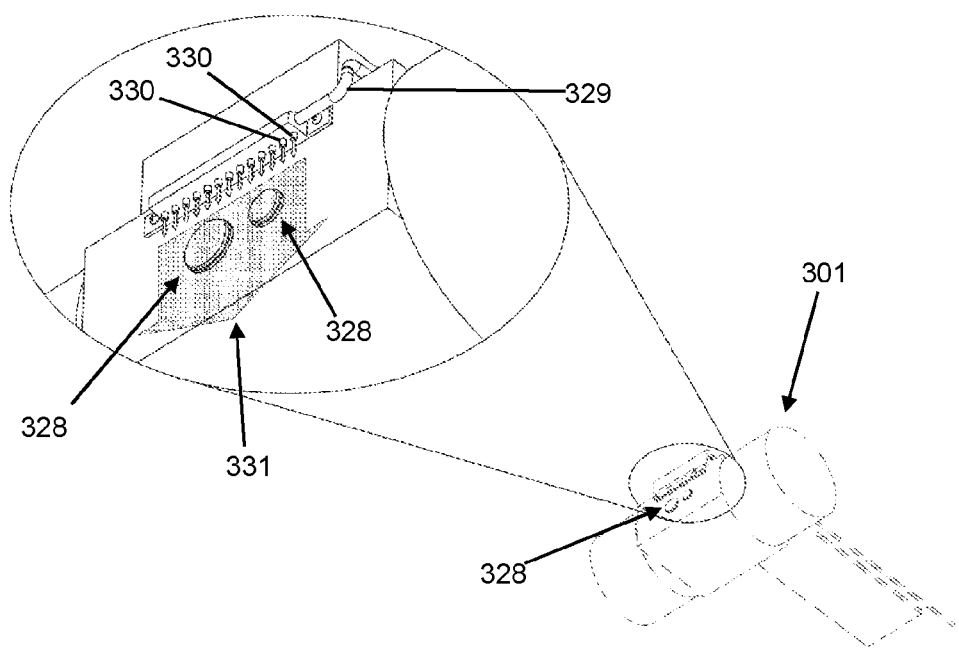
FIG. 45 shows an air curtain used to protect the sensing and vision systems.

FIG. 45 of the accompanying drawings shows a close up of two sensors, or cameras (328) mounted on the robotic vehicle (301). Compressed air is provided through a hose (329) and a series of nozzles (330) to create an air barrier (331) in front of the sensors. This may be run continuously when the robot is spraying to ensure materials cannot obstruct or stick to the sensing equipment. A valve may be provided so that air is diverted to the spray gun when not spraying to clean the nozzle and to the sensing equipment when spraying.

Figure 46:
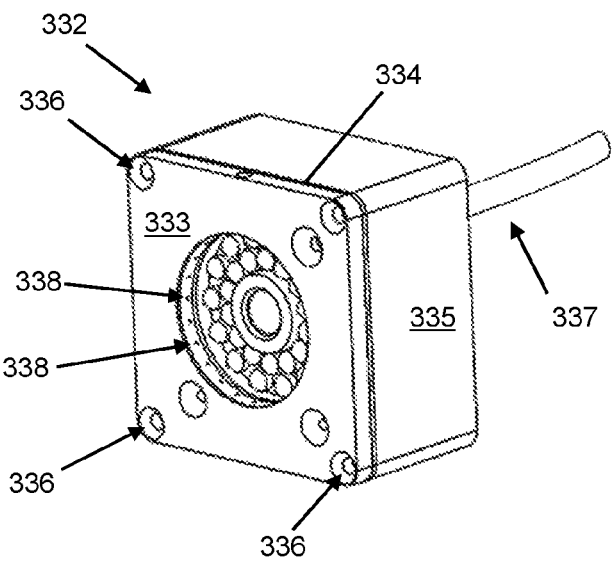
FIG. 46 shows a pressurised camera mount used to protect the vision system.

FIG. 46 of the accompanying drawings shows a camera (332) mounted inside of a container comprising a lid (333), seal (334) and back (335) held together with fixings (336). The container is pressurised with a supply of compressed air (337) which can escape from outlets (338) around the lens. Compressed air is supplied to the container whenever the robot is spraying and for short periods afterwards to ensure particles of insulation do not land on or obstruct the vision systems.

Figure 47:
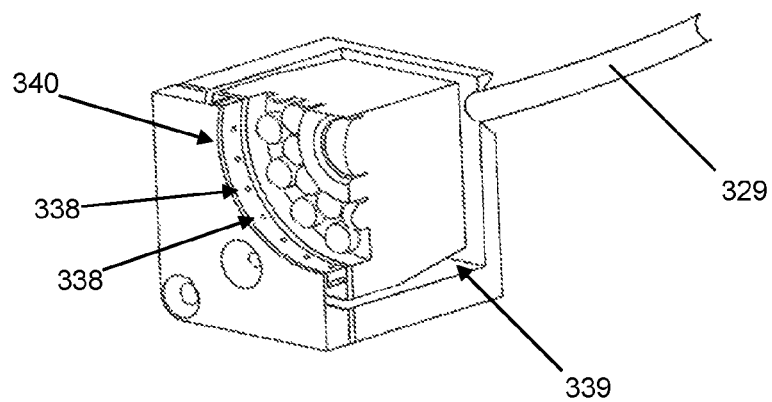
FIG. 47 shows the camera mount cut away revealing the air paths.

FIG. 47 of the accompanying drawings shows the camera and pressurised container sectioned on two planes. Air is provided through a hose (329), to a chamber (339), where it can feed the nozzles (338) positioned around the lens (340).

Figure 48:
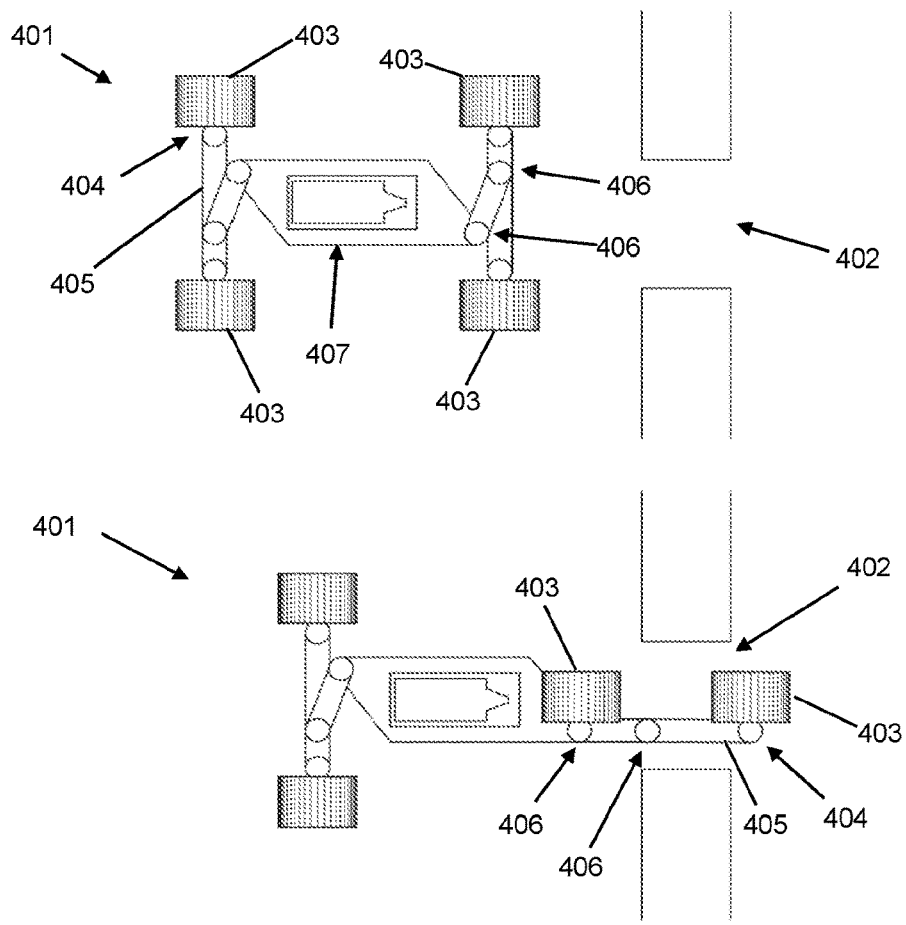
FIGS. 48 to 50 show a wheeled robotic vehicle negotiating a restricted opening.
Figure 49:
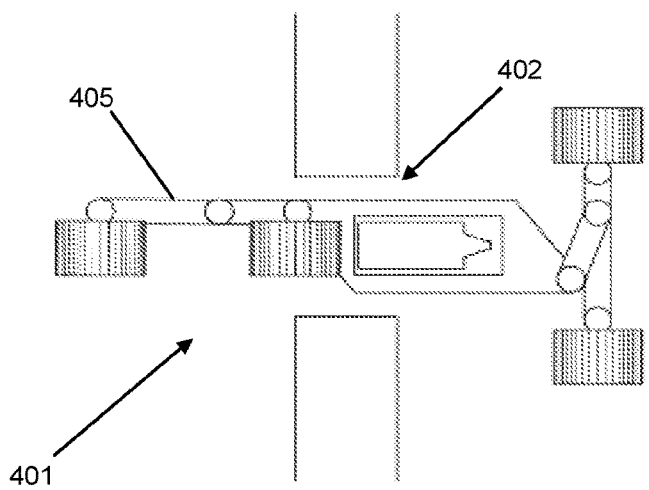
Figure 50:
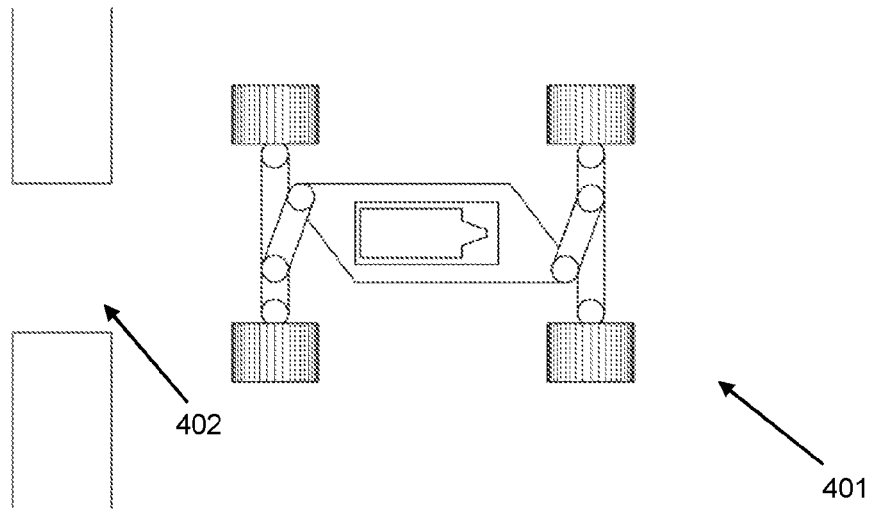

FIGS. 48 to 50 of the accompanying drawings show in plan view, over four stages a robotic vehicle (401) negotiating a restricted opening (402). The robotic vehicle has four driven wheels (403), each can pivot (404) relative to the axle (405) in combination or individually. The axles can rotate relative to the chassis with one or more pivot points (406). The robot carries a payload (407) which might include sensors and surveying equipment, a tool, or other device to carry out an operation. The lower view of FIG. 48 shows the robot (401) with the front axle (405) rotated ninety degrees and wheels (403) rotated ninety degrees relative to the axle so all wheels can drive forwards. FIG. 49 shows the robotic vehicle after the front portion has negotiated the restricted opening, and with the rear axle now folded. FIG. 50 shows the robotic vehicle having cleared the obstacle. The arrangement of the folding mechanism allows the wheels to be tucked inside and minimises the width when required. The actuation method may include either motors or gears, linear actuators, cables, or be driven by the wheels themselves and controlled with a ratchet mechanism.

Figure 51:
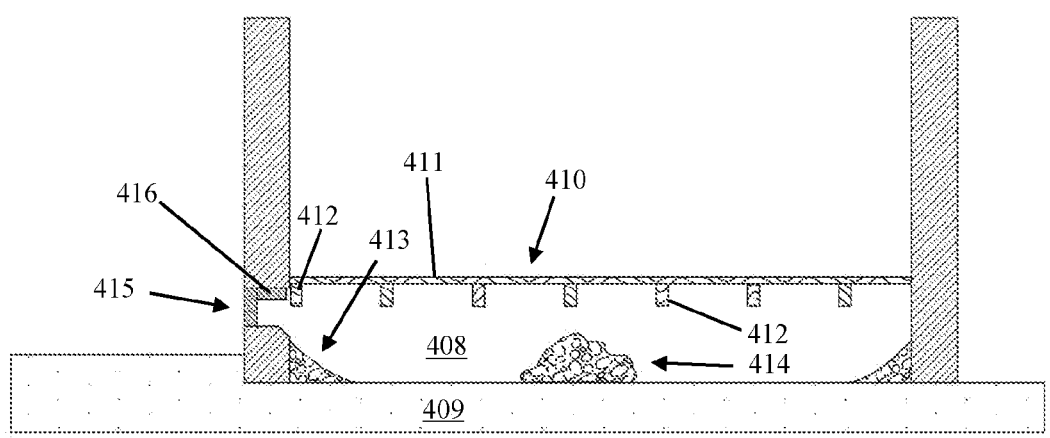
FIG. 51 shows an underfloor void typical of pre-1919 buildings in the UK.

FIG. 51 of the accompanying drawings shows an underfloor void (408) and the kind of environment in which the robotic vehicle may have to operate. The void consists of the space between the ground (409) and suspended timber floor above (410), which consists of floor boards (411) and supporting joists (412). Typically the height of the void is 400 mm, but may range between 150 mm to 600 mm or more. The void may have uneven surfaces (413) and obstacles (414) such as rubble, bricks and other debris. Access to the void may be through the floorboards above, by drilling a core hole through an exterior wall (typically diameter 100, 125 or 150 mm) or by removing an air vent (415) (typically 215 mm×155 mm or 215 mm×75 mm). As well as negotiating the restricted opening obstacles such as lintels (416) or joists (412) directly behind the opening need to be passed.

Figure 52:
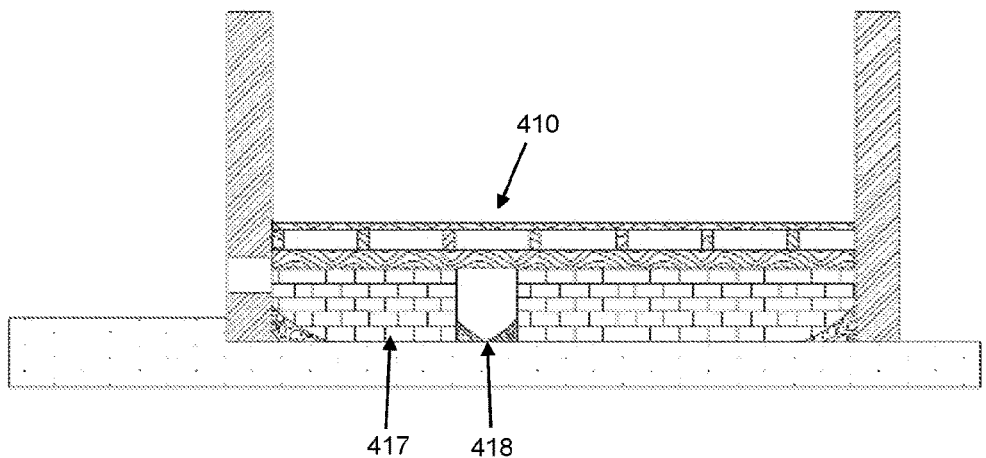
FIG. 52 shows an underfloor void and sleeper wall supporting the floor above.

FIG. 52 of the accompanying drawings shows an underfloor void and sleeper wall (417) which divides the void up and supports the floor (410) above. A hole (418) is shown to allow ventilation between different parts of the void, these may vary in size from 100 mm to 500 mm wide, but typically are 250 mm square.

Figure 53:
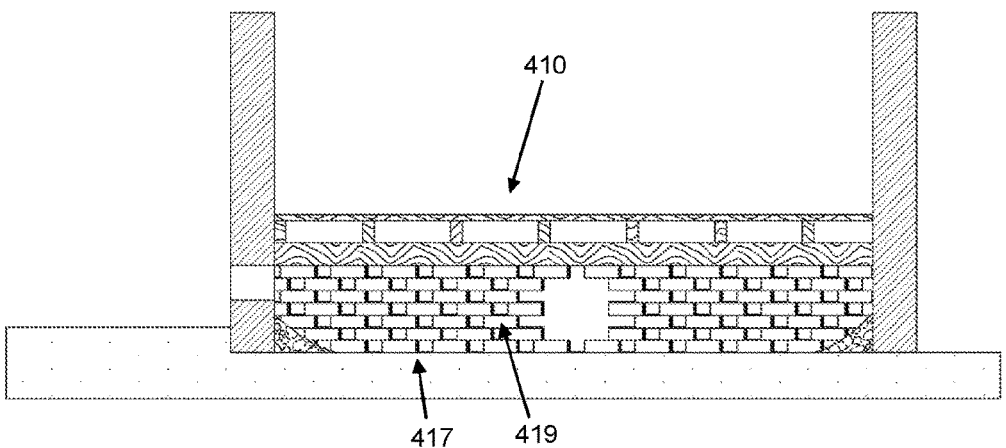
FIG. 53 shows a sleeper wall with alternative construction.

FIG. 53 of the accompanying drawings shows an alternative configuration of the sleeper wall (417), with a lattice brickwork arrangement (419) that allows air to pass from one side to the other.

Figure 54:
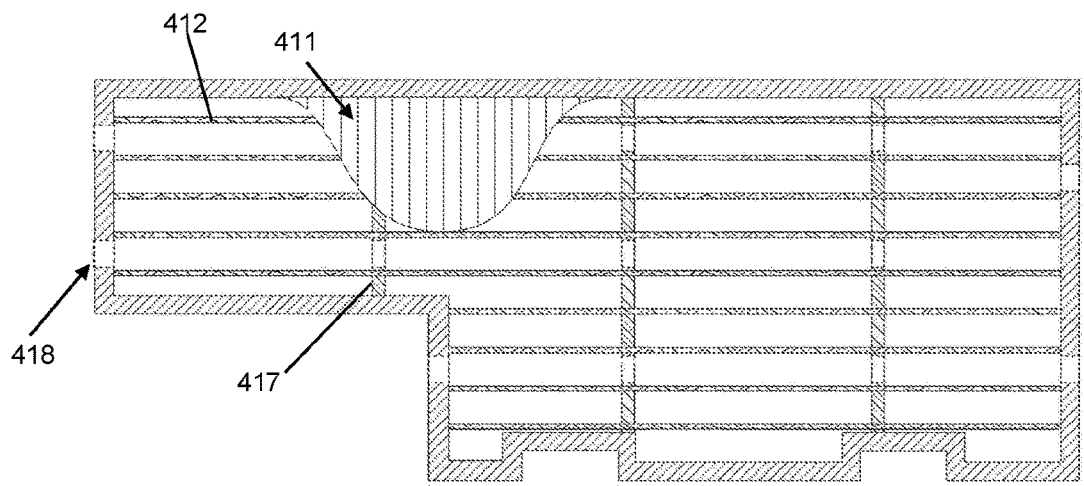
FIG. 54 shows a plan of the underfloor void and arrangement of supporting structure.

FIG. 54 of the accompanying drawings shows a plan view of the underfloor void from above, with the floorboards (411) cut away, which are supported by joists (412), which are in turn supported by sleeper walls (417). Openings (415) around the exterior walls (420) are shown where ventilation to the void is provided, along with openings (418) in the sleeper walls which allow air to flow through the void. The proposed robot vehicle can navigate through these spaces remotely.

Figure 55:
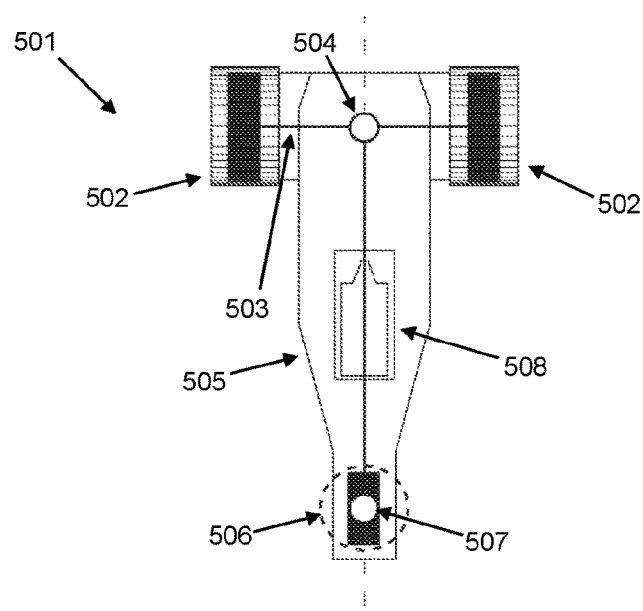
FIG. 55 shows a plan view of a robotic vehicle with two main drive wheels and single pivot point.
Figure 56:
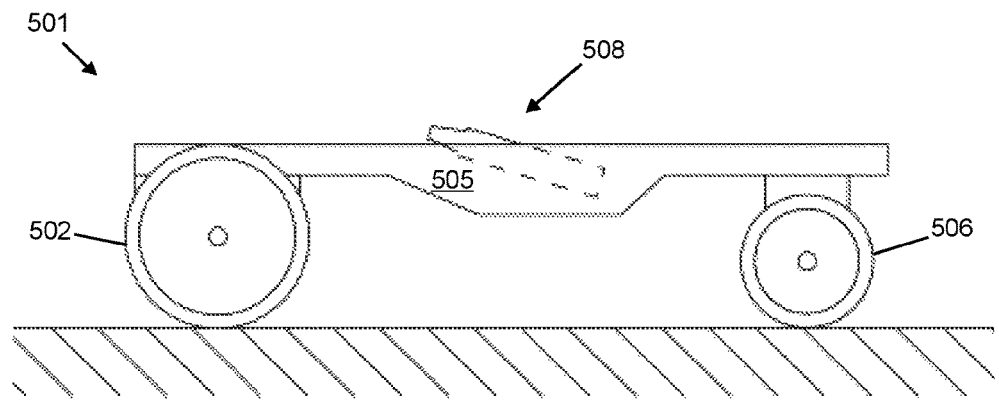
FIG. 56 shows a side view of the robotic vehicle of FIG. 55.

FIGS. 55 and 56 of the accompanying drawings show an alternative configuration robotic vehicle (501) with two driven wheels (502) mounted on an axle (503) which can pivot (504) relative to the chassis (505). A free wheel (506) that can pivot (507) relative to the chassis supports the vehicle at the rear. The robot carries a payload (508) which might include sensors and surveying equipment, a tool, or other device to carry out an operation.

Figure 57:
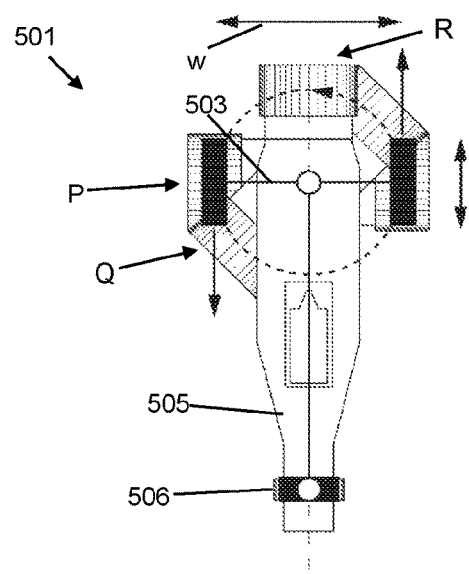
FIG. 57 shows how the robotic vehicle of FIGS. 55 and 56 can fold.

FIG. 57 of the accompanying drawings shows the robotic vehicle (501) with the axle (503) rotated relative to the chassis (505) in three positions; normal deployed operation (P), part folded (Q), and full folded (R). When fully folded the robotic vehicle is considerably narrower (w) than in its deployed position. The rear wheel (506) can rotate freely. By driving the left drive wheel forwards and the right wheel backwards (as indicated by the arrows in FIG. 57) the axle can be rotated clockwise (dashed arrow).

Figure 58:
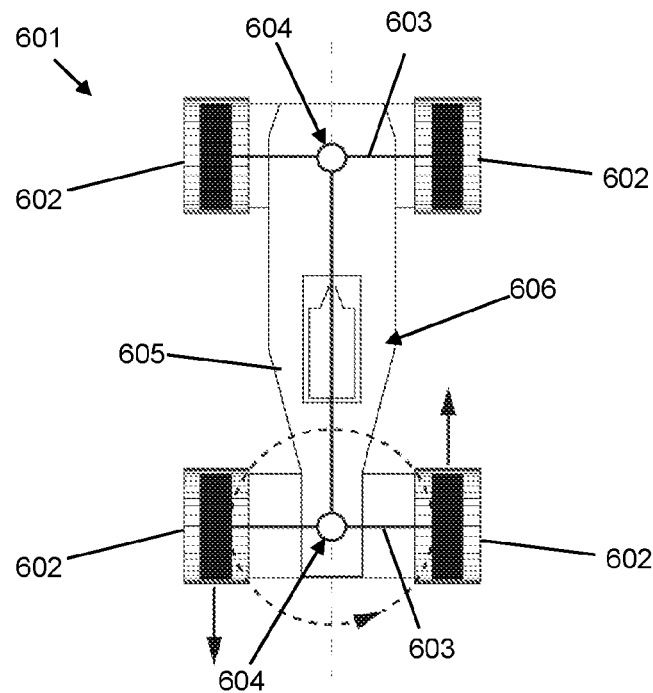
FIG. 58 shows a robotic vehicle with four drive wheels on two axles that can be aligned.

FIG. 58 of the accompanying drawing shows a robotic vehicle (601) with four driven wheels (602) on axles (603) that can pivot (604) relative to the chassis (605). To prevent folding, a locking mechanism on the pivot allows the robot to turn. By driving the wheel independently forwards and backwards (as indicated by the arrows in FIG. 58) the axle can turn (dashed arrow) relative to the chassis when the pivot (604) is free to rotate. The robot carries a payload (606) which might include sensors and surveying equipment, a tool, or other device to carry out an operation.

Figure 59:
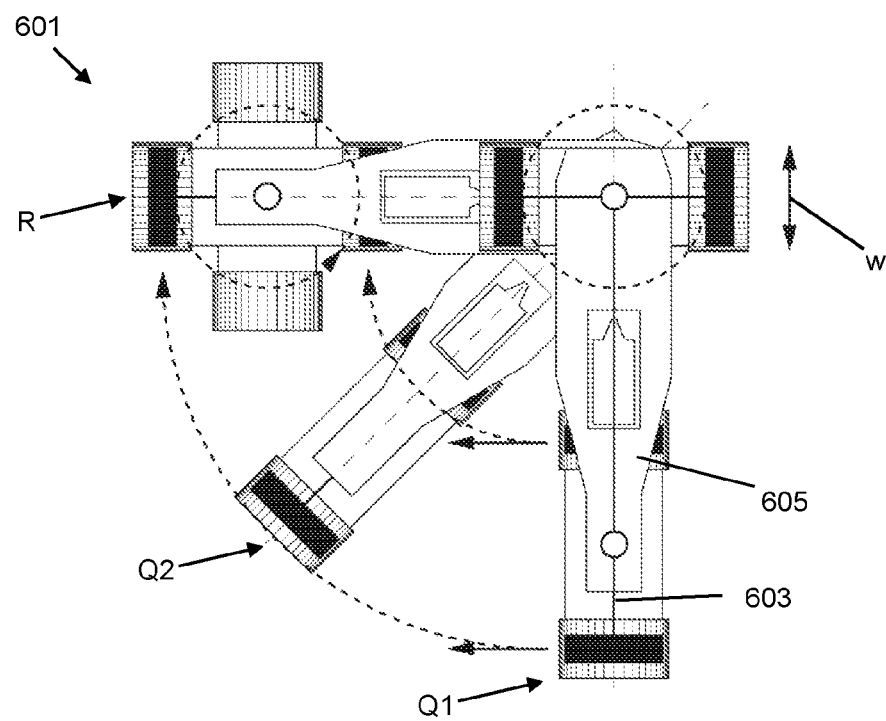
FIG. 59 shows how the robotic vehicle of FIG. 58 can fold.

FIG. 59 of the accompanying drawing shows the robotic vehicle (601) in the previous drawing with the axle (603) rotated ninety degrees relative to the chassis (605) so they are collinear. The vehicle is shown in three positions; a first part folded position (Q1), a second part folded position (Q2), and fully folded (R). When fully folded the robotic vehicle is considerably narrower (w) than in its deployed position. As shown in FIG. 59, in the fully folded position (R), the axle (603) can be rotated, if required (dashed line).

Figure 60:
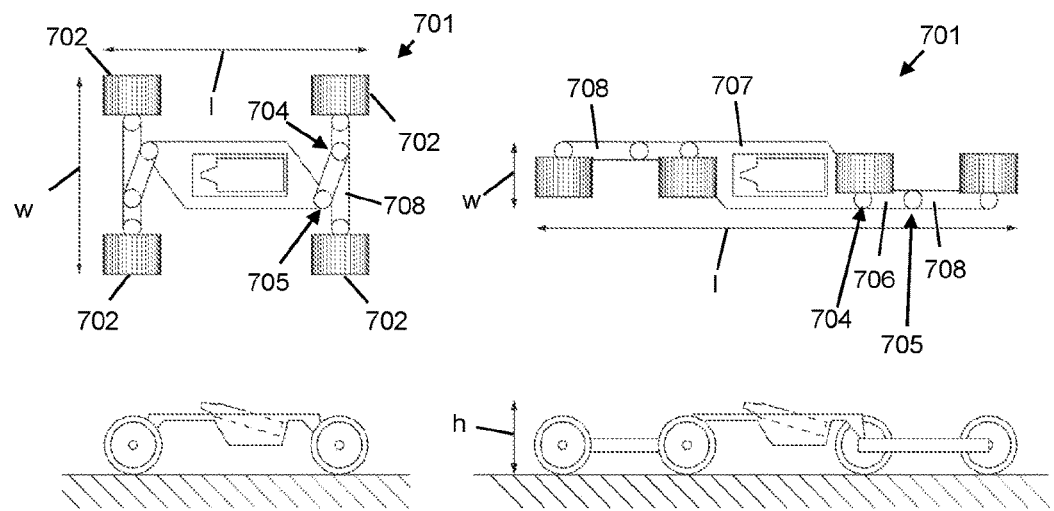
FIG. 60 shows different configurations of a folding robotic vehicle.

FIG. 60 of the accompanying drawings shows (in plan view and side view) a robotic vehicle (701) with four driven wheels (702) in two configurations; normal operational mode (left hand figures); and folded (right hand figures). When folded the vehicle is considerably narrower (w) than when deployed, whilst the length increases (I), and the height remains the same (h). The robot carries a payload (703) which might include sensors and surveying equipment, a tool, or other device to carry out an operation. The two pivots (704 & 705) and linkage (706) between the chassis (707) and each axle (708) allow the wheels and axle to be positioned in such a way to minimise the overall width when unfolded.

Figure 61:
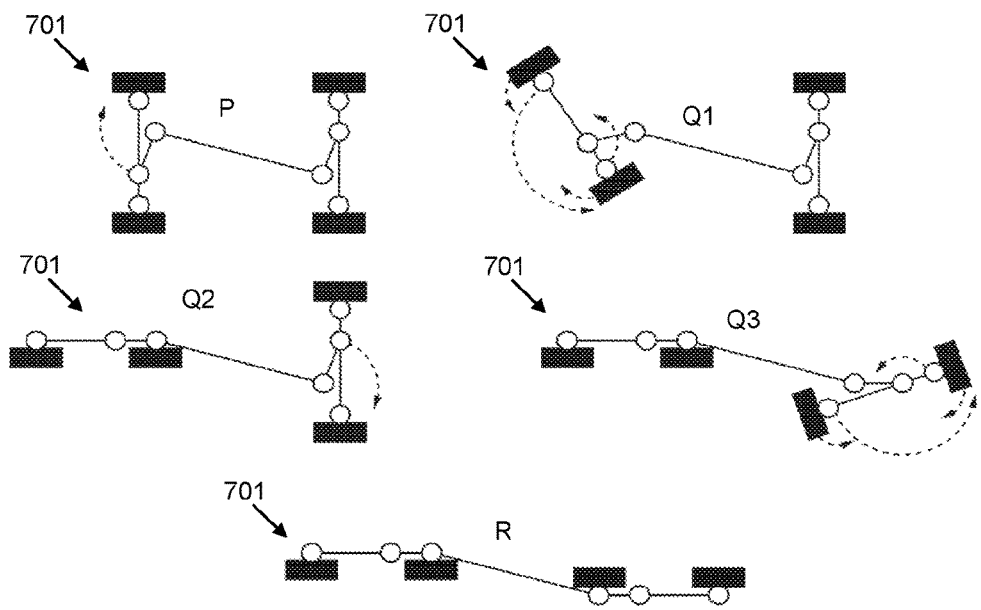
FIG. 61 shows how the robotic vehicle in FIG. 60 can fold.

FIG. 61 of the accompanying drawings shows the robotic vehicle (701) five stages; normal deployed mode (P); with the front axle pivoting (Q1); with the front axle unfolded so the axle is extended and co-linear to the chassis (Q2); with the rear axle pivoting (Q3); with both axles un folded and extended in line with each other (R).

Figure 62:
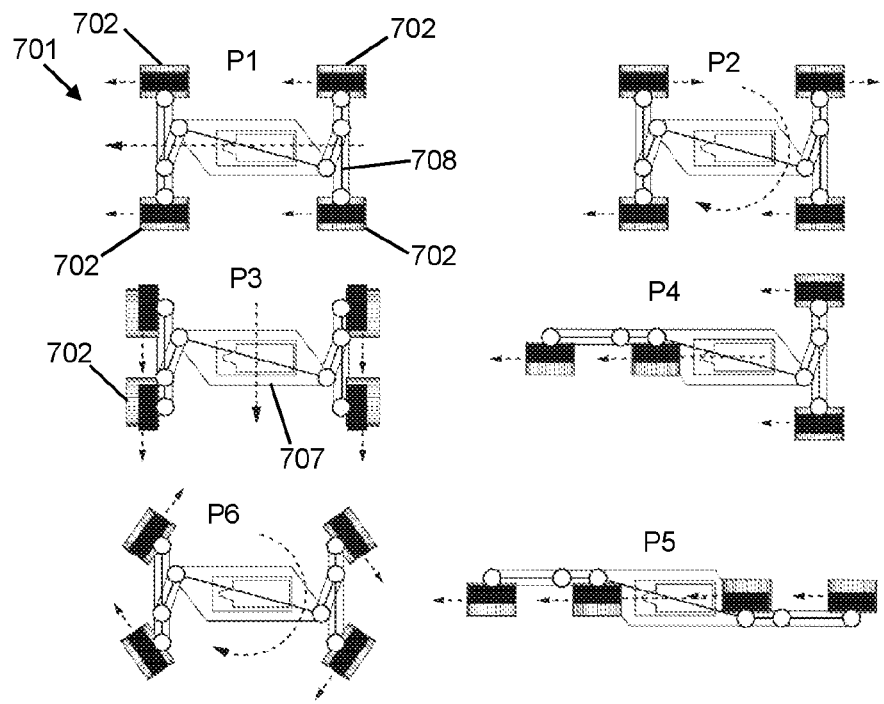
FIG. 62 shows the different drive modes of the robotic vehicle in FIGS. 60 and 61.

FIG. 62 of the accompanying drawings shows the robotic vehicle from the previous diagram in six stages (P1, P2, P3, P3, P4, P5, P6); the first (P1) shows the normal deployed configuration with each wheel (702) in line with the axle (708) driving forwards which in turn moves the vehicle forwards; the second (P2) shows the wheels on one side driving backwards and the other forwards resulting in the robot turning on the spot; the third (P3) shows each wheel (702) rotated ninety degrees around a respective pivot so the wheel drives perpendicular to the chassis (707) driving the robot sideways; the fourth (P4) shows the front axle unfolded with the front wheels rotated ninety degrees so they drive forwards in combination with the rear wheels; the fifth (P5) shows both axles unfolded, with wheels rotated ninety degrees so they can drive in line; the sixth (P6) shows each wheel rotated so that the axis of rotation for the wheel aligns with the centre of rotation of the vehicle to turn on the sport, as indicated by the dashed line.

Figure 63:
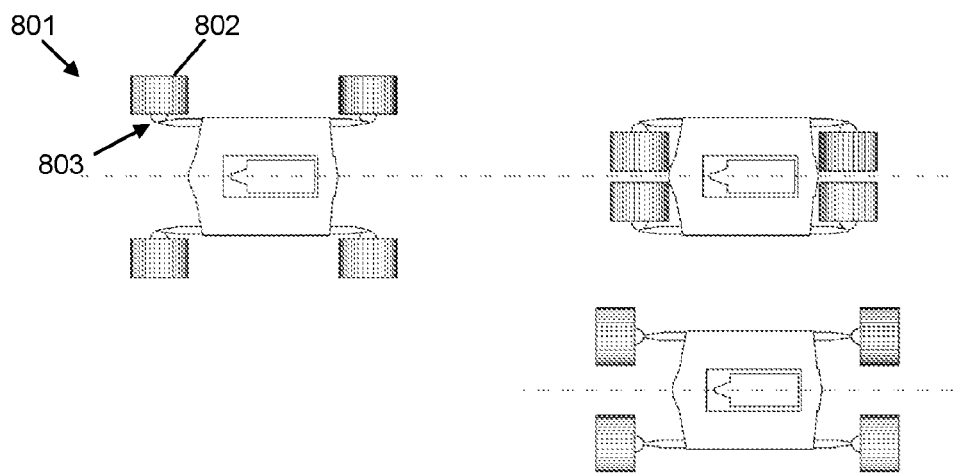
FIGS. 63 to 66 show alternative folding mechanisms.

FIG. 63 of the accompanying drawings shows a robotic vehicle (801) using an alternative folding mechanism where the wheels (802) can rotate 180 degrees about a pivot (803) to reduce the width of the vehicle.

Figure 64:
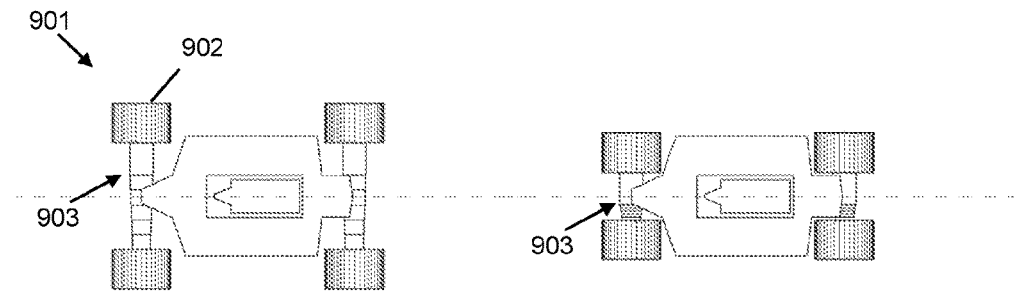

FIG. 64 of the accompanying drawings shows a robotic vehicle (901) using an alternative folding mechanism where the axles (902) can be shortened through a telescopic mechanism (903).

Figure 65:
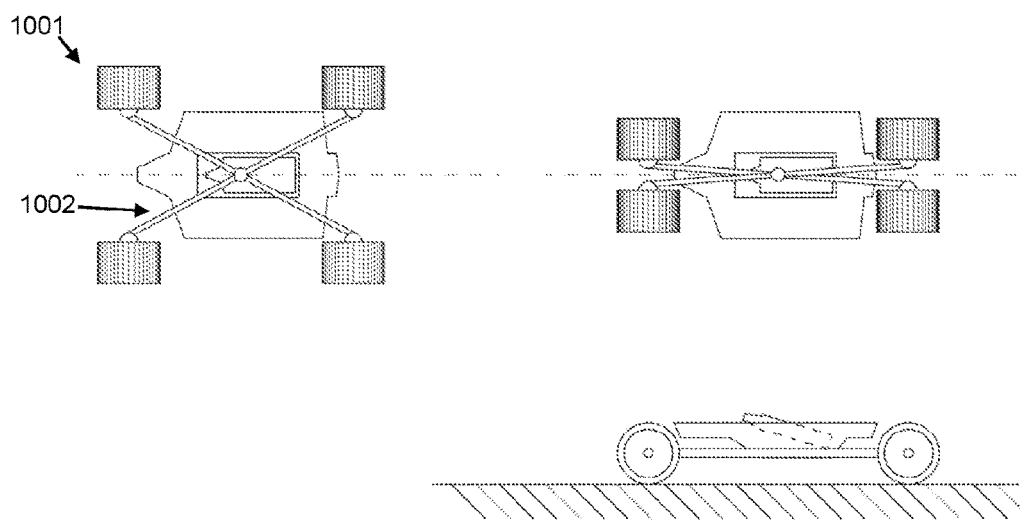

FIG. 65 of the accompanying drawings shows a robotic vehicle (1001) using an alternative scissors mechanism (1002) to reduce the width; linkages or gears ensure the wheels remain aligned with the direction of motion (4).

Figure 66:
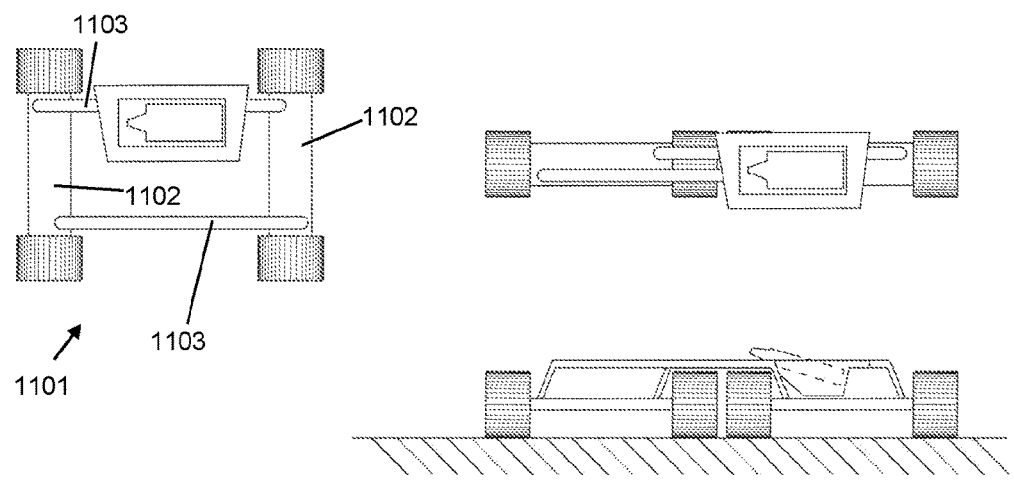

FIG. 66 of the accompanying drawings shows a robotic vehicle (1101) using a four bar linkage to collapse to a longer narrower shape, the two axles (1102) form two of the linkages that can pivot on the linkages that carry the chassis (1103).

Figure 67:
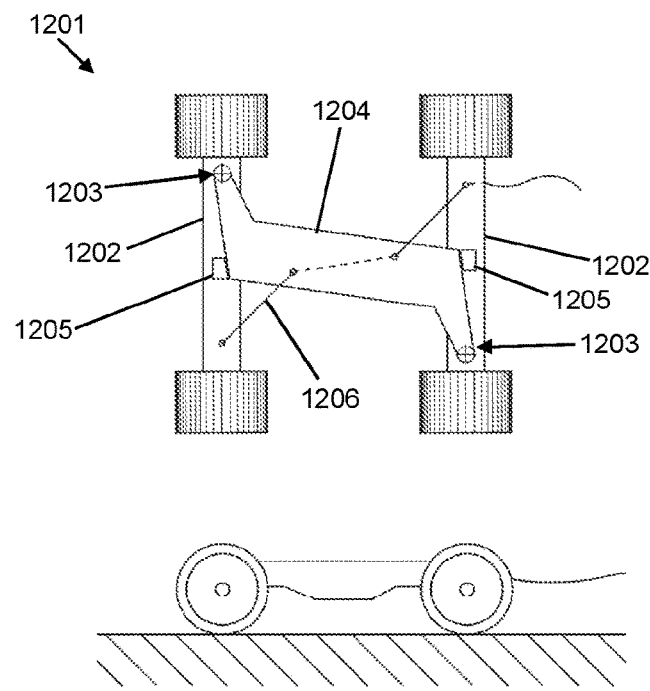
FIGS. 67 to 68 show a deployment mechanism using a cable.
Figure 68:
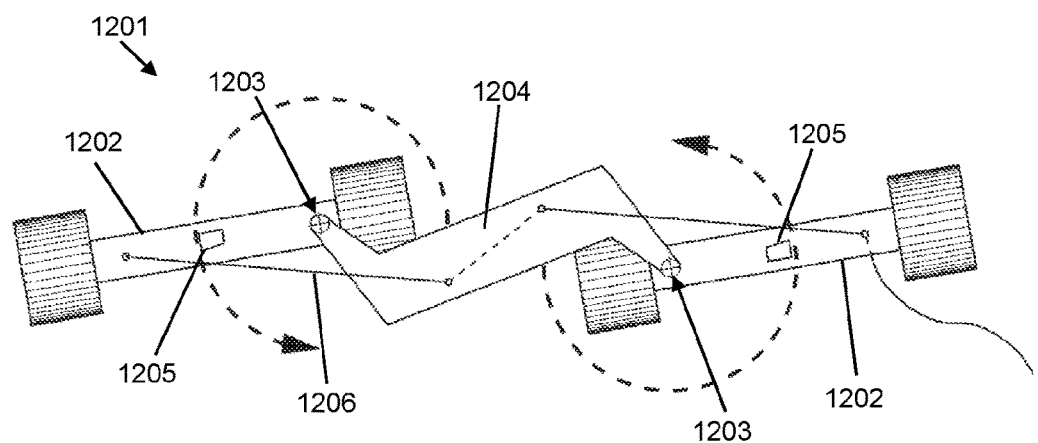

FIGS. 67 and 68 of the accompany drawings shows a robotic vehicle (1201) where each axle (1202) can pivot (1203) relative to the chassis (1204) to reduce the width when unfolded (FIG. 68). Mechanical stops (1205) prevent the axles rotating too far. A cable is shown in tension (1206), holding the vehicle together in the deployed configuration (FIG. 67), the cable is prevented from compressing and is held apart within the chassis (dashed line) and can be pulled tight by an operator or by other means such as a motor and held in place with a latch.

Figure 69:
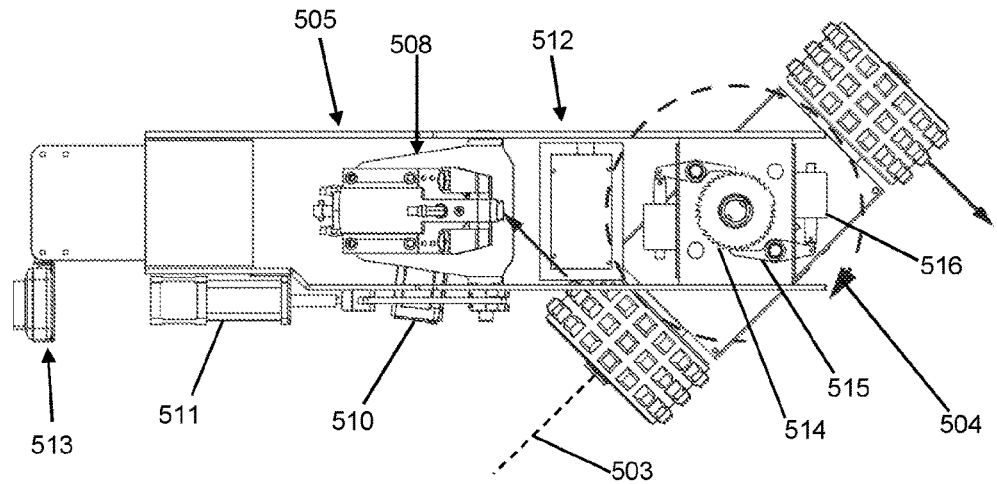
FIG. 69 shows the robot of FIG. 55.

FIG. 69 of the accompanying drawings shows the robotic vehicle from FIG. 55 from above, consisting of a chassis (505) that can pivot (504) relative to the axle (503) and is shown part folded. The chassis contains a spray gun (508) which can be rotated on two axes by motor (510) and linear actuator (511). Cameras mounted at the rear (512) and front of the robot (513) allow the operator to monitor operation and control the vehicle. Two driven wheels are shown driving forwards and backwards, respectively, rotating the axle clockwise (dashed line). A ratchet (514) with teeth in two directions, two pawls (515) and solenoids (516) allow the axle to be locked in position, or free to rotate in either or both directions.

Figure 70:
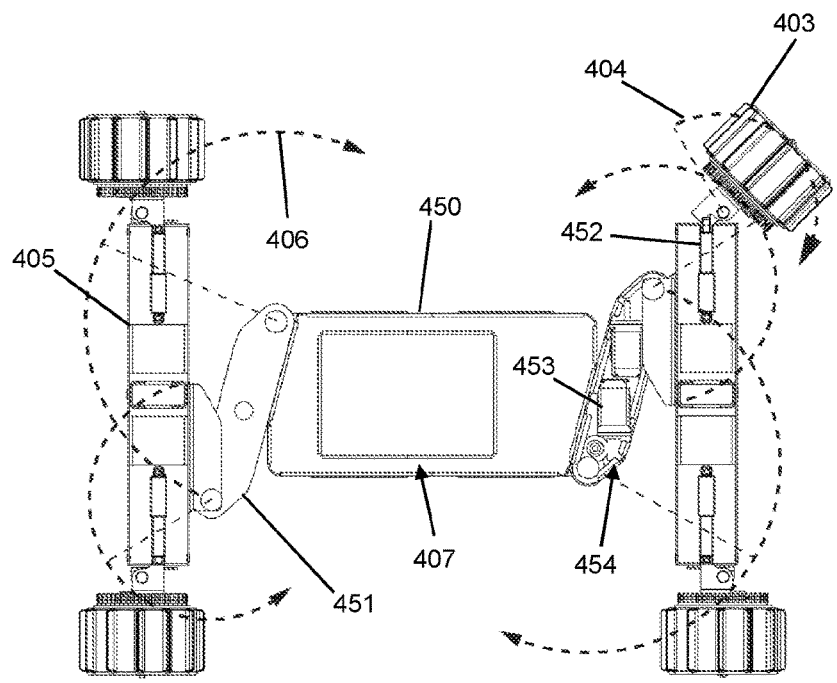
FIG. 70 shows the robot of FIG. 48.

FIG. 70 of the accompanying drawings shows the robotic vehicle from FIG. 48 above, consisting of a chassis (450), axle (405) and linkage (451) that can pivot (406) allowing the vehicle to unfold or deploy. The chassis contains space for a payload (407) to carry equipment to conduct the given operation and can be quickly dropped in or swapped out. Four driven wheels are shown (403) each can pivot (404) relative the axle and are controlled individually with four linear actuators (452). The folding and movement of the axle can be controlled individually with a motor (453) and worm gear (454) arrangement.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings) may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings).

The invention claimed is:

1. A method of forming an insulative covering on an internal surface of a building, the method comprising:
   introducing a robotic vehicle into an underfloor cavity of the building, wherein the underfloor cavity comprises a space between an underside of a suspended floor and the ground;
   spraying, by the robotic vehicle, a thermally insulating material in at least one layer onto the internal surface, wherein the internal surface comprises the underside of the suspended floor, wherein the robotic vehicle comprises a spray nozzle coupled to a hose that is coupled to a source of the thermally insulating material, and further wherein the source is located outside of the underfloor cavity;
   supplying, by the source, the thermally insulating material to the spray nozzle of the robotic vehicle via the hose; and
   allowing the thermally insulating material to solidify, wherein the solidified thermally insulating material forms the insulative covering of the internal surface.

2. The method of claim 1, wherein the thermally insulating material comprises an expandable foam material.

3. The method of claim 2, wherein the expandable foam material comprises a polyurethane foam.

4. The method of claim 1, further comprising shaping the thermally insulating material by applying a mould to the internal surface.

5. The method of claim 4, wherein the shaping the thermally insulating material further comprises forming a desired 3D shape of the covering.

6. The method of claim 1, further comprising machining, by a cutting tool of the robotic vehicle, the solidified thermally insulating material to remove excess thermally insulating material and to form a desired shape of the covering of the internal surface.

7. The method of claim 6, wherein the cutting tool of the robotic vehicle replaces the spray nozzle during the machining of the solidified thermally insulating material.

8. The method of claim 6, wherein the desired shape of the covering is a desired 3D shape of the covering.

9. The method of claim 1, further comprising applying a surface coating to the solidified thermally insulating material.

10. The method of claim 9, wherein the surface coating comprises polyurea.

11. The method of claim 1, wherein the robotic vehicle comprises a sensing device configured to monitor a thickness of the covering of the internal surface.

12. The method of claim 1, wherein the robotic vehicle is configured to apply the thermally insulating material autonomously to the internal surface in order to achieve a required thickness of the covering.

13. The method of claim 1, wherein the robotic vehicle further comprises a robotic arm coupled to the spray nozzle and configured to move the spray nozzle over the internal surface.

14. The method of claim 1, wherein the robotic vehicle comprises an umbilical cord that extends from the robotic vehicle to outside of the underfloor cavity, the umbilical cord comprising the hose for supplying the thermally insulating material.

15. The method of claim 14, wherein the umbilical cord comprises a power supply cable for supplying power to the robotic vehicle from outside of the underfloor cavity.

16. The method of claim 14, wherein the umbilical cord comprises one or more control signal wires for transmitting control signals to the robotic vehicle from outside of the underfloor cavity.

17. The method of claim 2, wherein the expandable foam comprises two parts, the method further comprising combining the two parts of the thermally insulating material in the spray nozzle.

18. The method of claim 1, wherein the spray nozzle is rotationally mounted to the robotic vehicle, and wherein spraying the thermally insulating material comprises rotating the spray nozzle to spray the thermally insulating material in the at least one layer to form the insulative covering of the internal surface.

19. The method of claim 18, wherein the spray nozzle is mounted for rotation relative to the robotic vehicle about two axes, wherein spraying the thermally insulating material comprises rotating the spray nozzle about the two axes to spray the thermally insulating material in the at least one layer to form the insulative covering of the internal surface.

20. The method of claim 18 further comprising:
   rotating the spray nozzle to spray the thermally insulating material in a pattern on the internal surface.

21. The method of claim 1, wherein spraying the thermally insulating material comprises spraying the thermally insulating material to a controlled depth on the internal surface.

* * * * *